United States Patent
Tsai et al.

(10) Patent No.: US 12,441,987 B2
(45) Date of Patent: Oct. 14, 2025

(54) MULTICELLULAR INTEGRATED BRAIN TISSUE IN NEUROLOGICAL DISEASES

(71) Applicant: Massachusetts Institute of Technology, Cambridge, MA (US)

(72) Inventors: Li-Huei Tsai, Cambridge, MA (US); Joel Blanchard, Arlington, MA (US); Alice Stanton, Boston, MA (US); Adele Bubnys, Cambridge, MA (US); Robert S. Langer, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/458,838

(22) Filed: Aug. 27, 2021

(65) Prior Publication Data

US 2022/0127581 A1 Apr. 28, 2022

Related U.S. Application Data

(60) Provisional application No. 63/106,320, filed on Oct. 27, 2020.

(51) Int. Cl.
| | |
|---|---|
| *C12N 5/071* | (2010.01) |
| *A61K 35/30* | (2015.01) |
| *C12N 5/00* | (2006.01) |
| *C12N 5/074* | (2010.01) |
| *C12N 5/079* | (2010.01) |

(52) U.S. Cl.
CPC ............ *C12N 5/0691* (2013.01); *A61K 35/30* (2013.01); *C12N 5/0062* (2013.01); *C12N 5/0607* (2013.01); *C12N 5/0622* (2013.01); *C12N 2502/28* (2013.01); *C12N 2503/00* (2013.01); *C12N 2513/00* (2013.01); *C12N 2533/90* (2013.01)

(58) Field of Classification Search
None
See application file for complete search history.

(56) References Cited

U.S. PATENT DOCUMENTS

2016/0186146 A1* 6/2016 Thomson ............. C12N 5/0619
702/19
2020/0181555 A1 6/2020 Hinojosa et al.

FOREIGN PATENT DOCUMENTS

| WO | WO 2018/027112 A1 | 2/2018 |
| WO | WO 2019/195798 A1 | 10/2019 |
| WO | WO 2021/077064 A1 | 4/2021 |

OTHER PUBLICATIONS

Brown et al. Recreating blood-brain barrier physiology and structure on chip: A novel neurovascular microfluidic bioreactor (2015), Biomicrofluidics, 9, pp. 1-15. (Year: 2015).*
Qian et al. Directed differentiation of human pluripotent stem cells to blood-brain barrier endothelial cells (2017), Science Advances, 3, pp. 1-12. (Year: 2017).*
Seo et al. Oligodendrocyte Precursor Cells Support Blood-Brain Barrier Integrity via TGF-b Signaling (2014), PLoS ONE, 9, pp. 1-11. (Year: 2014).*
Lin et al. APOE4 Causes Widespread Molecular and Cellular Alterations Associated with Alzheimer's Disease Phenotypes in Human iPSC-Derived Brain Cell Types (2018), Neuron, 98, pp. 1141-1154. (Year: 2018).*
Ferro et al. Materials for blood brain barrier modeling in vitro (Jan. 6, 2020), Materials Science & Engineering R, 140, pp. 1-12. (Year: 2020).*
Abud et al. iPSC-Derived Human Microglia-like Cells to Study Neurological Diseases (2017) Neuron, 94, pp. 278-293. (Year: 2017).*
Oberheim et al. Uniquely Hominid Features of Adult Human Astrocytes (2009), The Journal of Neuroscience, 29, pp. 3276-3287. (Year: 2009).*
Ozerdem et al. NG2 Proteoglycan is Expressed Exclusively by Mural Cells During Vascular Morphogenesis (2001), Developmental Dynamics, 222, pp. 218-227. (Year: 2001).*
Lee et al. Extracellular matrix protein 1 regulates cell proliferation and trastuzumab resistance through activation of epidermal growth factor signaling (2014) Breast Cancer Research, 16, pp. 1-17. (Year: 2014).*
International Search Report and Written Opinion for PCT/US2021/047853, mailed Jan. 12, 2022.
International Preliminary Report on Patentability for PCT/US2021/047853, mailed May 11, 2023.
Achyuta et al., A modular approach to create a neurovascular unit-on-a-chip. Lab Chip. Feb. 21, 2013;13(4):542-53. doi: 10.1039/c2lc41033h. PMID: 23108480.
Bang et al., Emerging Brain-Pathophysiology-Mimetic Platforms for Studying Neurodegenerative Diseases: Brain Organoids and Brains-on-a-Chip. Adv Healthc Mater. Jun. 2021;10(12):e2002119. doi: 10.1002/adhm.202002119. Epub May 24, 2021. PMID: 34028201.
Bergmann et al., Blood-brain-barrier organoids for investigating the permeability of CNS therapeutics. Nat Protoc. Dec. 2018;13(12):2827-2843. doi: 10.1038/s41596-018-0066-x. PMID: 30382243; PMCID: PMC6673652.
Hatherell et al., Development of a three-dimensional, all-human in vitro model of the blood-brain barrier using mono-, co-, and tri-cultivation Transwell models. J Neurosci Methods. Aug. 15, 2011;199(2):223-9. doi: 10.1016/j.jneumeth.2011.05.012. Epub May 14, 2011. PMID: 21609734.
Li et al., Toward a neurospheroid niche model: optimizing embedded 3D bioprinting for fabrication of neurospheroid brain-like co-culture constructs. Biofabrication. Nov. 10, 2020;13(1):10.1088/1758-5090/abc1be. doi: 10.1088/1758-5090/abc1be. PMID: 33059333; PMCID: PMC8387028.
Logan et al., Studying Human Neurological Disorders Using Induced Pluripotent Stem Cells: From 2D Monolayer to 3D Organoid and Blood Brain Barrier Models. Compr Physiol. Mar. 14, 2019;9(2):565-611. doi: 10.1002/cphy.c180025. PMID: 30873582; PMCID: PMC6705133.

(Continued)

*Primary Examiner* — Peter Paras, Jr.
*Assistant Examiner* — Maytee Marie Contes De Jesus
(74) *Attorney, Agent, or Firm* — Wolf, Greenfield & Sacks, P.C.

(57) ABSTRACT

The present disclosure provides, in some embodiments, in vitro brain (miBRAIN) having functional and structural properties of in vivo brain as well as methods of identifying compounds capable of influencing brain function.

20 Claims, 17 Drawing Sheets

(56) References Cited

OTHER PUBLICATIONS

Sokolova et al., Ultrasmall gold nanoparticles (2 nm) can penetrate and enter cell nuclei in an in vitro 3D brain spheroid model. Acta Biomater. Jul. 15, 2020;111:349-362. doi: 10.1016/j.actbio.2020.04.023. Epub May 13, 2020. PMID: 32413579.

Tan et al., Human mini-brain models. Nat Biomed Eng. Jan. 2021;5(1):11-25. doi: 10.1038/s41551-020-00643-3. Epub Dec. 14, 2020. PMID: 33318650.

Tang-Schomer et al., In vitro 3D regeneration-like growth of human patient brain tissue. J Tissue Eng Regen Med. May 2018;12(5):1247-1260. doi: 10.1002/term.2657. Epub Apr. 6, 2018. PMID: 29509306.

Tate et al., Assessing drug response in engineered brain microenvironments. Brain Res Bull. Aug. 2019;150:21-34. doi: 10.1016/j.brainresbull.2019.04.027. Epub May 1, 2019. PMID: 31054318; PMCID: PMC6754984.

Osaki et al., Engineered 3D vascular and neuronal networks in a microfluidic platform. Sci Rep. Mar. 26, 2018;8(1):5168.

\* cited by examiner

MULTICELLULAR INTEGRATED BRAIN TISSUE IN NEUROLOGICAL DISEASES

CROSS REFERENCE TO RELATED APPLICATIONS

This application claims the benefit under 35 U.S.C. § 119(e) of U.S. Provisional Application No. 63/106,320, filed Oct. 27, 2020, entitled "MULTICELLULAR INTEGRATED BRAIN TISSUE IN NEUROLOGICAL DISEASES," the entire disclosure of which is hereby incorporated by reference in its entirety.

GOVERNMENT SUPPORT

This invention was made with Government support under Grant No. UG3-NS115064 awarded by the National Institutes of Health (NIH). The Government has certain rights in the invention.

BACKGROUND

By 2050 the number of individuals with Alzheimer's disease (AD) in the US will nearly triple growing from 5 to 15 million with an annual cost estimated to be $1.2 trillion. Despite the present and looming toll on society, we have no effective therapies for AD or related dementias. The complexity of AD pathology presents a major challenge to development of therapeutics. AD pathogenesis proceeds over the course of several decades and arises through diverse genetic etiologies. Our understanding of the mechanisms has largely been limited to the effects of early-onset familial AD (fAD). Several mouse and in vitro models of fAD have mapped the pathological progression of this accelerated form of AD. However, fAD accounts for less than 5% of all AD cases. Late-onset AD or sporadic AD (sAD) affects individual over the age of 65 and accounts for more than 95% of all AD cases. The etiology of sAD remains largely unknown. Genomics studies identified genetic variants that correlate with increased risk for sAD and poor cognitive aging. Using this data, commercial personalized genotyping products are increasingly enabling individuals to self-identify whether they are carriers of genetic risks for sAD. Despite this growing genetic awareness, the next steps are currently missing. Even for the strongest risk factor for sAD, Apolipoprotein E4 (APOE4), the mechanisms underlying its association with AD or related pathologies is largely unclear. Therefore, there are currently no therapeutic or lifestyle interventions to mitigate genetic and nongenetic risk for developing AD.

Human neurodegeneration is difficult to study because of the limited accessibility to brain tissue. Animal models, such as transgenic rodents, can only recapitulate partial AD phenotypes. Consequently, a number of drugs that have shown promising results in mice have failed to prevent cognitive decline in late phase clinical trials. There are general concerns on the validity of rodent models and a number of genetic variants associated with increased risk for human disease are located in non-coding regions of the genome that are not well-conserved between species.

The development, characterization and validation of innovative human cellular model systems that recapitulate phenotypic, mechanistic and neuropathological hallmarks of AD/ADRD is a goal of researchers. Cellular disease models express critical aspects of human physiology and provide a measurable output for the brain areas affected by disease. Such model systems capture the complex, multi-faceted proteinopathies and/or vascular pathology observed in ADRDs, with multiple cell types represented in each model. In vitro microphysiological systems should mimic human ADRD pathophysiologies to facilitate the assessment of biomarkers, as well as the bioavailability, efficacy, and toxicity of therapeutic agents prior to entry into clinical trials.

SUMMARY

The present disclosure is based, at least in part, on the development of a 3 dimensional (3D) multi-cellular integrated human brain model (miBRAIN-chips) with, in some aspects, a cerebrovascular network comprised of human BEC vessels such as an in vitro blood brain barrier (endothelial cells, pericytes, and astrocytes) as well as neurons, microglia, oligodendrocytes and oligodendrocyte progenitor cells. The miBRAIN constitutes a physiological system for assessing the development of amyloid plaques in a microenvironment incorporating the major cell types of the brain, and thus provides a useful platform for identifying and screening compounds which are effective in reducing amyloid accumulation.

In some aspects the invention is a multi-cellular integrated micro brain (miBRAIN) containing a 3-dimensional (3D) matrix comprising a cerebrovascular network comprised of human brain endothelial cell (BEC) vessels comprised of a large interconnected network of human pluripotent stem cell-derived brain endothelial cells, human pluripotent stem cell-derived pericytes proximal to the BEC vessel on an apical surface and, dispersed throughout the matrix, human pluripotent stem cell-derived astrocytes, human myelinated cells, and human immune cells.

In other aspects, a multi-cellular integrated micro brain (miBRAIN) comprising a 3-dimensional (3D) matrix comprising human pluripotent-derived positive endothelial cells, human pluripotent-derived pericytes, human pluripotent-derived astrocytes, human pluripotent-derived neuron cells, and human pluripotent-derived microglial cells, each housed within the 3D matrix is provided.

In some embodiments the 3D matrix comprises an ECM substrate. In some embodiments the 3D matrix comprises type-I collagen. In some embodiments the 3D matrix comprises MATRIGEL® (a solubilized basement membrane matrix). In some embodiments the 3D matrix comprises RGD-polymer.

In some embodiments the microglial cells are derived from human hematopoietic progenitors cells (HPCs). In some embodiments the astrocytes in miBRAIN exhibit radial morphologies with numerous processes extending from the cell body. In some embodiments the endothelial cells express endothelial cell markers PECAM and/or VE-CAD. In some embodiments the pericytes express NG2 and/or PDGFrB. In some embodiments the miBRAIN has a culture media. In some embodiments the culture media comprises hESFM, AGS, B-27™ (a neuronal cell culture product) and one or more supplements selected from the group consisting of NT3, T3, IGF, PDGFB, cAMP, AA, BDNF, GDNF, mCSF, IL34, and VegF-A. In some embodiments, the miBRAIN further comprises at least one brain-mimicking ECM. In some embodiments, the brain-mimicking ECM comprises ECM1, ECM2, ECM3, ECM4, ECM5, ECM6, ECM7, ECM8, and/or ECM9. In some embodiments the miBRAIN comprises cell ratios cell ratios of about 5 to 10 parts neurons, about 5 to 10 parts BECs, about 1 to 5 parts astrocytes, about 1 to 5 parts OPCs/myelinating cells, about 1 to 5 parts pericytes, about 1 to 5 parts microglia/immune cells, and about 1 to 5 parts pericytes. In some embodiments at least one cell is an iPSC-derived cell. In some embodiments at least one cell-type may harbor APOE4 or other AD and neurological risk factor. In some embodiments the astrocytes express AQP4, GFAP and S100b. In some embodiments the iBBB comprises GLUT1, ZO1, VE-CADHERIN, PECAM or CLDN5. In some embodiments, the pericytes, the brain endothelial cells, and the astrocytes comprise iBBB (blood brain barrier). In some embodiments the miBRAIN comprises neurons having neurofilaments (SMI 311 and 312), synaptic markers (Synapsin, PSD95, vGLUT1, 2, 3 VGAT, and Gepherin) or NeuN. In some embodiments the miBRAIN comprises microglia expressing PU.1, TMEM119 and IBAL. In some embodiments the miBRAIN comprises oligodendrocytes that express MBP, SOX10, MAG, MOG, PLP1, O4 or OLIG2. In some embodiments the miBRAIN comprises oligodendrocyte precursors expressing PDGFrA and SOX10. In some embodiments miBRAIN comprises at least one type of patient specific cells.

In some aspects the method for identifying an inhibitor of amyloid-β peptide (Aβ) production and/or accumulation is provided and comprises contacting an miBRAIN with at least one candidate inhibitor and detecting an amount of Aβ in the presence and absence of the candidate inhibitor, wherein a reduced quantity of Aβ associated with the miBRAIN in the presence of the candidate inhibitor relative to an amount of Aβ associated with the miBRAIN in the absence of the candidate inhibitor indicates that the candidate inhibitor is an inhibitor of Aβ. In some embodiments the candidate inhibitor is in a library of compounds.

In other aspects the method for personalized testing of therapeutic agents in an Alzheimer's disease (AD), cerebral amyloid angiopathy (CAA) or tauopathy patient, is provided, and comprises contacting an miBRAIN, having a patient specific cell with a therapeutic agent, and detecting an amount of Aβ in the miBRAIN in the presence and absence of the therapeutic agent to determine therapeutic efficacy of the agent.

In some embodiments the patient specific cell is an APOE4 neuron. In some embodiments the patient specific cell is a cell derived from the patient. In other embodiments the patient specific cell is an iPSC. In some embodiments the iPSC is subsequently differentiated into neurons, brain endothelial cells, astrocytes, pericytes or smooth muscle cells, oligodendrocyte progenitors, and microglia. In some embodiments, at least one cell is a GcAMP-expressing neuron and the neurons develop spontaneous calcium activity that is measured via confocal or 2-photon imaging.

The details of one or more embodiments of the invention are set forth in the description below. Other features or advantages of the present invention will be apparent from the following drawings and detailed description of several embodiments, and also from the appended claims.

BRIEF DESCRIPTION OF DRAWINGS

The following drawings form part of the present specification and are included to further demonstrate certain aspects of the present disclosure, which can be better understood by reference to one or more of these drawings in combination with the detailed description of specific embodiments presented herein.

FIG. 1A shows immunocytochemistry with IBA1 antibody in APOE3 or APOE4 isogenic microglia. FIG. 1B and FIG. 1C show induced microglia-like cells treated with Aβ-555 and its uptake monitored demonstrate that APOE4 isogenic microglia took up less amyloid than APOE3 microglia.

FIG. 2A shows mEPSC amplitude and frequency in iPSC-derived neurons an isogenic APOE3 and APOE4 pair. FIG. 2B shows the mEPSC frequency data (Hz) of APOE3 and APOE4 neurons in bar graph form.

FIG. 3A shows incubator with LED lights connected to a computer for controlling lights and entraining neurons. FIG. 3B shows neuron encoded ChR2 entrained with blue lights at express neuronal activity gene cFOS. FIG. 3C shows co-cultures of neurons and astrocytes, which demonstrates that altering neuronal activity leads to changes in abundance and morphology of astrocytes.

FIG. 6A shows microglia-amyloid-vascular dynamics was readily recorded by two photon imaging in mice and human 3D engineered cultures. FIG. 6B shows cerebral organoid in which neurons were expressing the GECI GCAMP6G. A cell of interest was highlighted with circle. FIG. 6C shows a trace showing calcium oscillations in the cell of interest from panel B. FIG. 6D shows an example of calcium activity of neurons expressing GECI GCAMP6G in miBRAIN culture with three selected cells visualized in the right panels (yellow arrows). FIG. 6E shows response of GCAMP6G-expressing neurons in miBRAIN to wash-in of 1M KCl solution to a final concentration of 50 mM.

FIG. 9A shows staining of PECAM/DAPI. FIG. 9B shows staining of PDGFR beta/VE-CAD/DAPI.

FIG. 11A shows conventional neuronal differentiation protocols generated mixed populations of neurons and progenitors as shown by numerous neurofilament-negative nuclei. FIG. 11B shows neurons integrated into miBRAIN cultures express neurofilaments (SMI311).

FIG. 14D shows macroscopic images of miBRAINs long-term culture indicating maintenance of structural integrity in engineered hydrogels compared to MATRIGEL® (a solubilized basement membrane matrix).

DETAILED DESCRIPTION

Figure 1A:
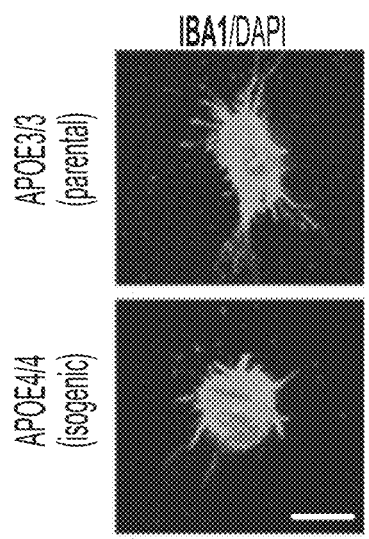
FIGS. 1A-1C show genetic polymorphisms associated with Alzheimer's disease (AD) influence function of iPSC-derived microglia.

Aspects of the disclosure relate to uses of a human 3D in vitro model of the brain for developing or identifying treatment strategies for neurodegenerative diseases such as Alzheimer's disease (AD). Human 3D in vitro models disclosed herein include cell culture media and components conditioned for optimal brain development that is suitable for determining genetic and molecular internetworks of neurodegenerative diseases.

Developing effective treatments for Alzheimer's disease, particularly sporadic Alzheimer's disease with a later onset, has been a challenge due to its complex disease mechanisms and lack of appropriate in vitro models. Without models that can accurately mimic pathogenesis of Alzheimer's disease in humans, drug screenings for personalized treatments are limited. The inventors of the instant application developed a human 3D in vitro model of the brain which recapitulates numerous molecular and physiological features of the intact brain tissue. The brain model disclosed herein is also referred to as a brain on a chip or a miBRAIN-chip. Prior artificial brains have not achieved the structural complexity and diversity of the brain on a chip disclosed herein. The miBRAIN-chip of the present disclosure provides advantages not previously found in prior art devices.

Human Brain Models

Aspects of the disclosure provide a tissue engineering approach that harnesses the innate ability of mature cells to self-assemble into complex 3D tissues. For example, the blood-brain barrier can be formed through the interaction of at least three cell types including brain endothelial cells (BECs), astrocytes, and pericytes. Capillary formation can be initiated by culturing endothelial cells in malleable ECM. Once capillaries are formed, they secrete PDGF-BB causing pericytes to migrate and occupy the perivascular space. Similar cytokine-mediated programs induce astrocytes to extend processes known as end-feet onto capillaries where they express high levels of channels and transporters critical for vascular clearance mechanisms.

In some embodiments, the present disclosure relates to a multi-cellular integrated micro brain (miBRAIN) comprising a 3-dimensional (3D) matrix. In some embodiments, the miBRAIN comprises a cerebrovascular network comprised of human brain endothelial cell (BEC) vessel comprised of a large interconnected network of human pluripotent-derived positive endothelial cells. In some embodiments, the miBRAIN comprises human pluripotent-derived pericytes proximal to the BEC vessel on an apical surface. In some embodiments, the miBRAIN comprises human pluripotent-derived astrocytes dispersed throughout the 3D matrix. In some embodiments, the miBRAIN comprises human myelinated cells dispersed throughout the 3D matrix and immune cells.

In some embodiments, the miBRAIN comprises human pluripotent-derived positive endothelial cells, human pluripotent-derived pericytes, human pluripotent-derived astrocytes, human pluripotent-derived neuron cells, and human pluripotent-derived microglial cells, each housed within the 3D matrix.

A skilled person in the art would appreciate that any cells or components may be included in the miBRAIN disclosed herein. For example, other neuronal cells in the central nervous system which might be found relevant for Alzheimer's disease pathogenesis may be included.

In some embodiments, the microglial cells are derived from human hematopoietic progenitors cells (HPCs). It should be appreciated that the microglial cells can be derived from any cells or stem cells that are capable of assisting with the preparation and production of microglial cells for the miBRAIN culture described herein.

In some embodiments, the astrocytes in miBRAIN exhibit radial morphologies with numerous processes extending from the cell body. The radial morphologies are known in the art as morphological characteristics that show radial processes. The astrocytes in the miBRAIN disclosed herein mimics the morphologies of the glial cells in vivo with active expression of neurofilament.

Leveraging biological principles disclosed herein, the inventors of the instant application reconstructed the human blood-brain barrier (BBB) or iBBB in vitro by first generating the mature cellular components of the BBB including brain endothelial cells, astrocytes, and pericytes from induced pluripotent stem cells (iPSCs) and then placing them in a 3D microenvironment with the proper physical and chemical parameters to promote cellular interactions and self-assembly. This led to the formation of an in vitro BBB with anatomical and physiological properties akin to the in vivo BBB. In some embodiments, the pericytes, the brain endothelial cells, and the astrocytes comprise iBBB (blood brain barrier). In some embodiments, the iBBB comprises Glucose transporter 1 (GLUT1).

Further leveraging the self-assembly approach, neurons were then incorporated into the iBBB model. In vivo human neurons closely associate with the cerebral vasculature, but do not disrupt one another's function. Likewise, using iPSC-derived neurons and oligodendrocytes an in vitro myelinated tissue was developed. These cells can be integrated into the 3D structure to create the human brain on a chip.

In some embodiments, the endothelial cells in the miBRAIN express endothelial cell markers PECAM and/or VE-CAD. In some embodiments, the endothelial cells in the miBRAIN can express any endothelial cell markers that are suitable for the brain models described herein. In some embodiments, the pericytes in the miBRAIN express NG2 and/or PDGFrB. In some embodiments, the pericytes in the miBRAIN can express any biomarkers that are suitable for the brain models described herein.

It is known that in vivo, AD leads to widespread alterations in cellular composition and interactions, transcriptional programs and pathology including, reduced myelin volume, breakdown of the BBB, loss pericytes, disease associated microglial signatures, activated astrocytes[43] and loss of inhibitory neuronal fitness leading to neuronal hyper excitability[44]. AD pathogenesis may exhibit similar hallmarks in vitro and genetic diversity between humans will lead to inter-patient variability in the presentation of in vitro pathological signatures of AD as seen in the clinic. The genetically diverse human miBRAIN chips disclosed herein may be used to map AD pathogenesis in vitro and to cross-reference these signatures to clinical hallmarks, stages, and postmortem end-states. How genetic risk factors predispose AD may also be mapped using isogenic iPSC. Several AD-risk genes are expressed in cells that constitute the brain and may directly influence the accumulation and clearance of Aβ. For instance, employing APOE4, the strongest risk factor for AD, the miBRAIN may be used as a prototype to dissect the genetic mechanisms underlying AD risk and test for differential drug efficacies and toxicities.

Without wishing to be bound by any theory, apolipoprotein E (APOE) protein is highly expressed in astrocytes and microglia of the brain. In humans, there are three genetic polymorphisms of APOE: ε2, ε3, and ε4. The ε4 isoform of APOE (APOE4) is the most well known risk factor for CAA and sporadic AD. The genotype of the cell plays an important role in the iBBB and related assays. In some embodiments, the Aβ producing cell expressed APOE3 and/or APOE4. In some embodiments, the Aβ producing cell may have an APOE3/3 genotype. In some embodiments, the Aβ producing cell may have an APOE3/4 genotype or an APOE4/4 genotype. In some embodiments, the Aβ producing cell may have an APOE4/4 genotype. Pericytes also play an important role in the production of amyloid-β peptide (Aβ).

Other genetic risk factors such as BIN1, ABCA7, TREM2, and PICALM may be modeled and used in the miBRAIN.

In some embodiments the brain on a chip incorporates additional cells and tissues which provide tissue diversity to the miBRAIN-chip. The miBRAIN-chip may be used for a variety of testing purposes, including as a model of disease such as Alzheimer's disease (AD), cerebral amyloid angiopathy (CAA), and tauopathy for testing activity and or efficacy of therapeutic agents, for personalized testing of therapeutic agents, and as a novel platform for testing the therapeutic efficacy of compounds from a library of therapeutics.

In some embodiments, the miBRAIN-chip recapitulates phenotypic, mechanistic and neuropathological hallmarks of disease states such as AD/ADRD (Alzheimer's Disease Related Dementias). Cellular disease models as used herein can express critical aspects of human physiology and provide a measurable output for the brain areas affected by disease. Model systems are expected to capture the complex, multi-faceted proteinopathies and/or vascular pathology observed in ADRDs, with multiple cell types represented in each model. In vitro microphysiological systems should mimic human ADRD pathophysiologies to facilitate the assessment of biomarkers, as well as the bioavailability, efficacy, and toxicity of therapeutic agents prior to entry into clinical trials. The miBRAIN-chip of the present disclosure achieves these goals.

In some embodiments, the miBRAIN-chip is a culture media that supports the diverse cell-types present. In some embodiments, the culture media of miBRAIN comprises hESFM, AGS, B-27™ (neuronal cell culture product) and one or more supplements selected from the group consisting of NT3, T3, IGF, PDGFB, cAMP, AA, BDNF, GDNF, mCSF, IL34, and VegF-A. As shown in the examples, many different types of media formulations were assayed for the ability to support 3D monocultures of the different miBRAIN cell-types (i.e., brain endothelial cells, pericytes, astrocytes, neurons, microglia, oligodendrocyte progenitor cells (OPCs), and oligodendrocytes). In some embodiments, a serum-free miBRAIN culture media based on human endothelial growth media that can support each cell-type in 3D culture can be used.

In some embodiments, the miBRAIN comprises at least one brain-mimicking ECM. In some embodiments, the brain-mimicking ECM comprises ECM1, ECM2, ECM3, ECM4, ECM5, ECM6, ECM7, ECM8, and/or ECM9. In some embodiments, the miBRAIN may include any brain-mimicking components for optimizing miBRAIN cultures.

In some embodiments, electrical activity in the miBRAIN is enhanced by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture. In some embodiments, the levels of mean firing rate in the miBRAIN are increased by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture. In some embodiments, the levels of spikes per burst in the miBRAIN are increased by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture. In some embodiments, the levels of burst duration in the miBRAIN are increased by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture.

In some embodiments, neuronal morphology in the miBRAIN is enhanced by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture. In some embodiments, the enhanced neuronal morphology is enhanced expression of PECAM and/or Tuj. In some embodiments, the expression of PECAM and/or Tuj is enhanced by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture. In some embodiments, the enhanced neuronal morphology can relate to any enhanced expression of biomarkers. In some embodiments, the miBRAIN is optimized for mechanical properties. It is appreciated that mechanical properties may include degrees of stiffness of the cell culture. Mechanical properties may be altered through the alteration of the extracellular matrix structure.

In some embodiments, neuronal phenotype in the miBRAIN is enhanced by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture.

In some embodiments, myelination in the miBRAIN is enhanced by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture. In some embodiments, the expression of neurofilament is enhanced by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to a control cell culture.

As used herein, a "control cell culture" refers to a cell culture that does not contain the components of the miBRAIN disclosed herein. For example, the control cell culture may be a cell culture that is used in the art for modeling AD but does not mimic the in vivo environment. The control cell culture may be a neuron monoculture. The control cell culture may be a conventional MATRIGEL® (a solubilized basement membrane matrix). The control cell culture may be a 2D neuron culture. The control cell culture may be a single neuron cell or a combination of neuronal cells such as a neuron-astrocyte co-culture. The control cell culture is not an engineered hydrogel matrix disclosed herein.

The presence and integration of each cell type may be quantitatively assessed by a panel of histological markers and compared to the quantitative proportion of cell types in the human brain. In some embodiments, the markers that are used are as follows:

Endothelial cells: Vascular Endothelial Cadherin, PECAM
Pericytes: NG2 and/or PDGFrB
Astrocytes: GFAP and/or S100b
Cerebrovascular network comprised of human BEC vessels: GLUT1
Neurons: Neurofilaments (SMI 311 and/or 312) and/or NeuN
Microglia: TMEM119 and/or IBA1
Oligodendrocytes: MBP
Oligodendrocyte precursors: PDGFrA and/or SOX10

Thus, in some aspects, the present disclosure is a micro brain (miBRAIN) that is composed of a 3 dimensional (3D) matrix having at least 4 different cell types, such as human brain endothelial cell (BEC), human pluripotent-derived pericytes, Neurons, microglia, oligodendrocytes, oligodendrocyte precursors, and human pluripotent-derived astrocytes arranged therein. In some embodiments, the human brain endothelial cells (BECs) may form a vessel comprised of a large interconnected network of human pluripotent-derived positive endothelial cells, referred to herein as a cerebrovascular network comprised of human BEC vessels. In some embodiments the cerebrovascular network comprised of human BEC vessels is an in vitro blood brain barrier (iBBB).

In some embodiments, the endothelial cells, pericytes, neurons, microglia, oligodendrocytes, oligodendrocyte precursors and astrocytes are optionally human pluripotent-derived cells. For instance, the cells may be iPSC-derived cells, such as iPSC-derived CD144 positive cells. Without wishing to be bound by any theory, autologous induced pluripotent stem cells (iPSCs) can be differentiated into any cell type of the three germ layers: endoderm (e.g. the stomach linking, gastrointestinal tract, lungs, etc.), mesoderm (e.g. muscle, bone, blood, urogenital tissue, etc.) or ectoderm (e.g. epidermal tissues and nervous system tissues).

As used herein, the term "pluripotent cells" refers to cells that can self-renew and proliferate while remaining in an undifferentiated state and that can, under the proper conditions, be induced to differentiate into specialized cell types. Pluripotent cells, encompass embryonic stem cells and other types of stem cells, including fetal, amniotic, or somatic stem cells. Exemplary human stem cell lines include the H9 human embryonic stem cell line. Additional exemplary stem cell lines include those made available through the National Institutes of Health Human Embryonic Stem Cell Registry and the Howard Hughes Medical Institute HUES collection.

In some embodiments, pluripotent stem cells encompass induced pluripotent stem cells, or iPSCs, a type of pluripotent stem cell derived from a non-pluripotent cell. Without wishing to be bound by any theory, iPSCs are commonly known as a type of pluripotent stem cell that can be generated directly from a somatic cell. Known iPSCs can include but are not limited to embryonic stem cells. Examples of parent cells include somatic cells that have been reprogrammed to induce a pluripotent, undifferentiated phenotype by various means. Such "iPS" or "iPSC" cells can be created by inducing the expression of certain regulatory genes or by the exogenous application of certain proteins. Methods for the induction of iPS cells are known in the art. As used herein, hiPSCs are human induced pluripotent stem cells, and miPSCs are murine induced pluripotent stem cells.

In some embodiments, the cells are seeded onto a 3D matrix or scaffold material. The matrix or scaffold material, may be, for instance, a hydrogel. As used herein, "3D matrix" refers to cell-adhesive matrix that is used in 3D cell culture for the use of mimicking in vivo cellular processes and responses. In some embodiments, the 3D matrix comprises at least one extracellular matrix (ECM) substrate. In some embodiments, the 3D matrix comprises type-I collagen. In some embodiments, the 3D matrix comprises type-I collagen. In some embodiments, the 3D matrix comprises MATRIGEL® (a solubilized basement membrane matrix). In some embodiments, the 3D matrix comprises RGD-polymer.

In some embodiments, the matrix may be formed of naturally derived biomaterials such as polysaccharides, gelatinous proteins, or ECM components comprising the following or functional variants thereof: agarose; alginate; chitosan; dextran; gelatin; laminins; collagens; hyaluronan; fibrin, and mixtures thereof. Alternatively, in some embodiments, the matrix may be a hydrogel formed of MATRIGEL® (a solubilized basement membrane matrix), Myogel and CARTIGEL™ (an extracellular tissue-derived matrix), or a combination of MATRIGEL®, Myogel and CARTIGEL™ and a naturally derived biomaterial or biomaterials. Components of the ECM, e.g., FN, laminin, and collagen, interact with the cell surface via the integrin family of receptors, a group of divalent cation-dependent cell surface glycoproteins that mediate cellular recognition and adhesion to components of the ECM and to other cells. Ligands recognized by integrins typically contain an RGD amino acid sequence that is expressed in many ECM proteins. Exemplary molecules that mediate cell adhesion and/or movement include FN, laminin, collagen, thrombospondin 1, vitronectin, elastin, tenascin, aggrecan, agrin, bone sialoprotein, cartilage matrix protein, fibrinogen, fibrin, fibulin, mucins, entactin, osteopontin, plasminogen, restrictin, serglycin, SPARC/osteonectin, versican, von Willebrand Factor, polysaccharide heparin sulfate, cell adhesion molecules including connexins, selectins, collagen, RGD (Arg-Gly-Asp) and YIGSR (Tyr-Ile-Gly-Ser-Arg) peptides, glycosaminoglycans (GAGs), hyaluronic acid (HA), integrins, selectins, cadherins and members of the immunoglobulin superfamily. Carbohydrate ligands of the ECM include the polysaccharides hyaluronic acid, and chondroitin-6-sulfate.

In some embodiments, the matrix is an ECM matrix that are polymers functionalized with RGD motifs. An RGD polymer is a polymer made from a tri-amino acid sequence, arginine-glycine-aspartate, or "RGD". In some embodiments, polymers functionalized with other amino acid motifs may be used. Polymers also include cross-linking groups including reactive thiols and UV crosslinking to solidify the matrix providing a solid support for 3D cell culture.

The 3D matrix may be generated using an optimal mixture of the cells disclosed herein. For instance, in some embodiments, the miBRAIN may be generated using cell ratios of about 5 to 10 parts neurons, about 5 to 10 parts BECs, about 1 to 5 parts astrocytes, about 1 to 5 parts OPCs/myelinating cells, about 1 to 5 parts pericytes, about 1 to 5 parts microglia/immune cells, and about 1 to 5 parts pericytes. In some embodiments, the cell ratios of pericytes may be about 5 to 10 parts or 1 to 10 parts. In some embodiments, the miBRAIN may be generated using any combinations of cell ratios. It should be appreciated that cell ratios of miBRAIN may be optimized based on the purpose of the miBRAIN or cell culture conditions.

In other embodiments the miBRAIN may be generated using about 1 million endothelial cells per ml, about 200,000 astrocytes per ml and about 200,000 pericytes per ml.

As disclosed herein, a unique feature of the 3D matrix is that the cells are seeded onto the matrix and self-assemble into a miBRAIN structure. The cells arrange themselves such that the BECs form a large interconnected network of cells, similar to a capillary wall. The other cells including neurons, microglia, oligodendrocytes, oligodendrocyte precursors, endothelial cells, astrocytes, pericytes are arranged within the BEC vessel and dispersed throughout the 3D matrix. Endothelial cells form networks of capillary tubes. Pericytes may occupy space (perivascular space) adjacent to the endothelial cells.

In some embodiments, astrocytes may extend process onto the endothelial tubes. In some embodiments, the endothelial tubes comprise expression of transporter molecules. In some embodiments, the transporter molecules may be AQP4. In some embodiments, the transporter molecules may be localized. Neurons extend axons that are dispersed throughout the cultures. Some oligodendrocytes engage axons and form myelin sheaths around the axons. In some embodiments, microglia and OPCs are present throughout the culture.

In some embodiments, at least one cell in the miBRAIN is an iPSC-derived cell. In some embodiments, at least one cell in the miBRAIN is an APOE4 neuron. In some embodiments, at least one cell is a GcAMP-expressing neuron. In some embodiments, miBRAIN comprises at least one type of patient specific cells.

The miBRAIN disclosed herein has structural properties that mimic in vivo brain tissue. In addition to the manner in which the cells assemble in the 3D structure, the miBRAIN and cells found therein have structural properties which are associated with in vivo brain tissue such as expression of specific genes associated with brain cells in vivo.

In some embodiments, the astrocytes express GFAP and/or S100b. In some embodiments, the human brain endothelial cell (BEC) may express at least any one of Vascular Endothelial Cadherin and PECAM. In some embodiments, the pericytes may express NG2 and/or PDGFrB. In some embodiments, the cerebrovascular network comprised of human BEC vessels or Blood brain barrier may express GLUT1. In some embodiments, the neurons may express Neurofilaments and/or NeuN. In some embodiments, the neurofilaments are SMI 311 and/or SMI 312. In some embodiments the microglia may express TMEM119 and/or IBA1. In some embodiments the oligodendrocytes may express MBP. In some embodiments the oligodendrocyte precursors may express PDGFrA and/or SOX10. In some embodiments, the cells in the miBRAIN can express any biomarkers or genes associated with in vivo brain.

In some embodiments, the expression of the biomarkers or genes associated with in vivo brain in the miBRAIN is comparable to the in vivo brain. In some embodiments, the in vivo brain is a human brain who has a neurodegenerative disease such as Alzheimer's disease.

The miBRAIN disclosed herein has functional properties that mimic in vivo brain tissue. Functional properties associated with the miBRAIN (that mimic in vivo brain) include, for instance, spontaneous calcium activity and electrophysiological responses of the neuronal network, and contractile activity of pericytes associated with the in vitro vasculature. In some embodiments, myelinate and non-myelinated axons may be part of functional properties. In some embodiments, human microglia are present and exhibit phagocytic, endocytic activity and/or inflammatory responses.

Therapeutic Screening and Development of Personalized Treatments

Aspects of the disclosure provides that the miBRAIN has a variety of uses, including studies of brain structure and function. The miBRAIN provides highly detailed and accurate testing of therapeutics on brain function, on a general basis or for personalized assessments. The miBRAIN can be probed with therapeutics to determine the ability of the therapeutic compound to impact the cells of the brain. The tested therapeutic agents may be any type of compound, nucleic acid, peptide, polysaccharide, small molecule. The therapeutic agents may be compounds that are known to have a specific function or the function may be unknown prior to testing. For instance, the therapeutic may be part of a library of therapeutic agents or compounds.

In some embodiments, the present disclosure provides methods for identifying an inhibitor of amyloid-β peptide (Aβ) production and/or accumulation. The formation of senile plaques containing fibrils composed of Aβ is frequently observed in Alzheimer disease's patients. Prolonged and continuous accumulation of Aβ can lead to advanced neurodegeneration and dementia.

In some embodiments, the present methods for identifying an inhibitor of amyloid-O peptide (Aβ) production and/or accumulation comprise contacting a miBRAIN with at least one candidate inhibitor and detecting an amount of Aβ in the presence and absence of the candidate inhibitor. In some embodiments, the candidate inhibitor is in a library of compounds. In some embodiments, a reduced quantity of Aβ associated with the miBRAIN in the presence of the candidate inhibitor relative to an amount of Aβ associated with the miBRAIN in the absence of the candidate inhibitor indicates that the candidate inhibitor is an inhibitor of Aβ. In some embodiments, the quantity of Aβ associated with the miBRAIN in the presence of an inhibitor of Aβ is reduced by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to the miBRAIN in the absence of such inhibitor of Aβ.

A personalized miBRAIN can be developed for patient specific testing. In some embodiments, the personalized miBRAIN may be composed of one or more cells that have one or more genetic properties associated with a patient, such as APOE4. In some embodiments, the personalized miBRAIN may be self-assembled using one or more cells isolated from a patient.

A personalized miBRAIN may assessed from responsiveness to a particular therapeutic agent to determine how a particular patient or class of patients may respond to treatment with a therapeutic agent.

The present disclosure provides methods for personalized testing of therapeutic agents in an Alzheimer's disease (AD), cerebral amyloid angiopathy (CAA) or tauopathy patient. In some embodiments, the present methods for personalized testing comprise contacting a miBRAIN with a therapeutic agent and detecting an amount of Aβ in the miBRAIN in the presence and absence of the therapeutic agent to determine therapeutic efficacy of the agent. In some embodiments, the miBRAIN comprises a patient specific cell. In some embodiments, the patient specific cell is a brain cell. In some embodiments, the patient specific cell is an APOE4 neuron. In some embodiments, the patient specific cell is a cell derived from the patient. In some embodiments, the patient specific cell can be any cell that is suitable for the methods and miBRAIN described herein.

In some embodiments, the amount of Aβ in the miBRAIN in the presence of the therapeutic agent is reduced by at least 5%, 10%, 20%, 30%, 40%, 50%, 60%, 70%, 80%, 90%, 100%, or by at least 2-fold, at least 5-fold, at least 10-fold, at least 20-fold, at least 50-fold, at least 100-fold, or at least 1000-fold compared to the miBRAIN in the absence of such the therapeutic agent.

The therapeutic agent may be mixed with a pharmaceutically acceptable carrier (excipient), including buffer, to form a pharmaceutical composition. "Acceptable" means that the carrier must be compatible with the active ingredient of the composition (and preferably, capable of stabilizing the active ingredient) and not deleterious to the miBRAIN cells or to a subject to be treated. As used herein, a pharmaceutically acceptable carrier does not include water and is more than a naturally occurring carrier such as water. In some embodiments, the pharmaceutically acceptable carrier is a formulated buffer, a nanocarrier, an IV solution etc. In some embodiments, a pharmaceutically acceptable carrier may be sterile or non-sterile. Pharmaceutically acceptable excipients (carriers) including buffers, which are well known in the art as is the development of suitable treatment regimens for using the particular compositions described herein in a variety of treatment regimens. See, e.g., Remington: The Science and Practice of Pharmacy 20th Ed. (2000) Lippincott Williams and Wilkins, Ed. K. E. Hoover. Typically, these formulations may contain at least about 0.1% of the therapeutic compound or more, although the percentage of the active ingredient(s) may, of course, be varied and may conveniently be between about 1% or 2% and about 70% or 80% or more of the weight or volume of the total formulation. Naturally, the amount of active compound in each therapeutically-useful composition may be prepared in such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable. The pharmaceutical compositions to be used in the present methods can comprise pharmaceutically acceptable carriers, excipients, or stabilizers in the form of lyophilized formulations or aqueous solutions. (Remington: The Science and Practice of Pharmacy $20^{th}$ Ed. (2000) Lippincott Williams and Wilkins, Ed. K. E. Hoover). Acceptable carriers, excipients, or stabilizers are nontoxic to recipients at the dosages and concentrations used, and may comprise buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol; low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrans; chelating agents such as EDTA; sugars such as sucrose, mannitol, trehalose or sorbitol; salt-forming counter-ions such as sodium; metal complexes (e.g., Zn-protein complexes); and/or non-ionic surfactants such as TWEEN™ (polysorbate), PLURONICS™ (poloxamers) or polyethylene glycol (PEG). Pharmaceutically acceptable excipients are further described herein.

In some aspects of the disclosure, screening assays can be used for the miBRAIN described herein. In one embodiment, the screening assays are high throughput screening assays. The term "high throughput screening" as used herein refers to automated in vitro testing of the effect of compounds or conditions on multiple miBRAINs and such screening is typically performed with the aid of computer or robot-controlled processes. In one embodiment, the cells and methods described herein are useful for screening a compound for a biological activity. As used herein, the phrase "screening a compound for a biological activity" refers to identifying or testing a compound with respect to its physiological or pharmacological effects on the normal or abnormal biochemical function of one or more cells. As used herein, the phrase "biological activity" includes but is not limited to cell toxicity (cytotoxicity), apoptosis, cell death, signal transduction, cell signaling, cell differentiation, loss of pluripotency, cell growth, or anti-neurological activity.

In one embodiment, the biological activity is anti-neurological activity. As used herein, "anti-neurological" refers to the effect of a compound on a cell of the nervous system, and particularly a cell incorporated into the miBRAIN that has an impact on neurological function, including Aβ accumulation, when compared to a corresponding cell that is untreated. In one embodiment, anti-neurological activity is a component of neurodegenerative disease. The assessment of anti-neurological activity may be a determination of the worsening of or ability to alleviate a neurodegenerative disease Alleviating a neurodegenerative disease includes delaying the development or progression of the disease, or reducing disease severity. Alleviating the disease does not necessarily require curative results. As used therein, "delaying" the development of a disease means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset. As used herein "onset" or "occurrence" of a neurodegenerative disease includes initial onset and/or recurrence.

MiBRAIN Assays

Aspects pf the present disclosure provides that miBRAINs are generated from isogenic iPSC that harbor AD risk and non-risk genetic variants. In some embodiments, miBRAINs may be exposed to conditioned media containing elevated pathogenic proteins such as amyloid and/or aggregated or phosphorylated Tau. These experiments can then be employed to determine the effect of genetic risk variants on formation of pathological hallmarks of AD or other neurological diseases. In some embodiments, progression of AD and neurodegeneration can be monitor in the miBRAIN using RNA sequencing, histology, non-invasive imaging or electrical measurements.

In some embodiments, genetically isogenic and no-isogenic mixed miBRAIN cultures with one or more cell-types containing genetic risk factors can be generated to determine the contribution of each cell type to AD pathogenesis. Identifying the causal cell-types for each pathological feature will enable molecular and biochemical studies to identify therapeutic opportunities.

In some embodiments, the miBRAIN-chip may be used as a pre-clinical tool for segregating drugs based on genetically responsive populations and their efficacy at each disease stage. In some embodiments, isogenic miBRAINs or a genetically diverse panel of miBRAIN are generated. The miBRAINs can then be exposed to in vitro pathogenesis and therapeutic drugs. In some embodiments, the miBRAINs can be used for subsequently monitoring the pathological disease progression for each drug and genotype. In some embodiments, the miBRAIN can be employed to determine the efficacy of each drug for each APOE-genotype. In some embodiments, the miBRAIN can be used to establish optimal therapeutic windows for each drug and genetic population to inform clinical trial design. In these experiments, AD environments can be applied to miBRAIN-chips and then drugs can be applied at different time-points throughout in vitro disease progression.

Those of ordinary skill in the art will appreciate that the present disclosure will employ, unless otherwise indicated, conventional techniques of molecular biology (including recombinant techniques), microbiology, cell biology, biochemistry and immunology, which are within the skill of the art.

EXAMPLES

In order that the invention described herein may be more fully understood, the following examples are set forth. The examples described in this application are offered to illustrate the methods, compositions, and systems provided herein and are not to be construed in any way as limiting their scope.

Materials and Methods

Cell Lines and Differentiation

All hESC and hiPSC were maintained in feeder-free conditions in mTeSR1 medium (Stem Cell Technologies) on MATRIGEL® (a solubilized basement membrane matrix) coated plates (BD Biosciences). iPSC lines were generated by the Picower Institute for Learning and Memory iPSC Facility. CRISPR/Cas9 genome editing was performed as previously described. ESC/iPSC were passaged at 60-80% confluence using 0.5 mM EDTA solution for 5 minutes and reseeding 1:6 onto MATRIGEL®-coated plates.

BEC Differentiation from iPSC

BEC differentiation was adapted from Qian et al., 2017 (Directed differentiation of human pluripotent stem cells to blood-brain barrier endothelial cells. Sci Adv 3, e1701679 (2017)). Human ESC/iPSC's were disassociated to single cell via ACCUTASE® (a cell detachment solution) and reseeded at $35*10^3/cm^2$ onto MATRIGEL® coated plates in mTeSR1 supplemented with 10 μM Y27632 (Stem Cell Technologies). For the next two days, media was replaced with mTesR1 medium daily. On the third day, the medium as changed to DeSR1 medium (DMEM/F12 with L-glutamine substitute GLUTAMAX™ (Life Technologies) Supplemented with 0.1 mM B-mercaptoethanol, 1× MEM-NEAA, 1× penicillin-streptomycin and 6 μM CHIR99021 (R&D Systems). The following 5 days the medium was changed to DeSR2 (DMEM/F12 with GLUTAMAX™ (Life Technologies) Supplemented with 0.1 mM B-mercaptoethanol, 1× MEM-NEAA, 1× penicillin-streptomycin and neuronal cell culture product B-27™ (Invitrogen)) and changed every day. After 5 days of DeSR2, the medium was changed to hECSR1 Human Endothelial SFM (ThermoFisher) supplemented with B-27™, 10 μM retinoic acid and 20 ng/mL bFGF. The BEC's were then split using ACCUTASE® and reseeded with hECSR1 supplemented with 10 μM Y27632. The BECs were then maintained through hECSR2 medium (hECSR1 medium lacking RA+bFGF).

Pericyte Differentiation Protocol

Pericytes differentiation was adapted from Patsch et al., 2015 (Patsch, C. et al. Generation of vascular endothelial and smooth muscle cells from humanpluripotent stem cells. Nat. Cell Biol. 17, 994-1003 (2015)) and Kumar et al., 2017 (Kumar, A. et al. Specification and Diversification of Pericytes and Smooth Muscle Cells from Mesenchymoangioblasts. Cell Rep 19, 1902-1916 (2017)). iPSC's were disassociated to single cell via ACCUTASE® (a cell detachment solution) and reseeded onto MATRIGEL®-coated plates at 40,000 cells/cm$^2$ in mTeSR1 media supplemented with 10 μM Y27632. On day one media was changed to N2B27 media (1:1 DMEM:F12 with GLUTAMAX™ (a L-glutamine substitute) and a basal medium, NEUROBASAL™ Media (Life Technologies), supplemented with neuronal cell culture product B-27™, N-2, and penicillin-streptomycin) with 25 ng/ml BMP4 (Thermo Fisher PHC9531) and 8 μM CHIR99021. On day 4 and 5 medium was changed to N2B27 Supplemented with 10 ng/mL PDGF-BB (Peppro-tech, 100-14B) and 2 ng/mL Activin A (R&D Systems, 338-AC-010). Pericytes were then maintained in N2B27 media until co-cultured.

NPC Differentiation Protocol

NPCs were differentiated using dual SMAD inhibition and FGF2 supplementation as described in Chambers et al., *Nat. Biotech* 2009 (Chambers, S. M. et al. Combined small-molecule inhibition accelerates developmental timing and converts human pluripotent stem cells into nociceptors. *Nat Biotechnol* 30, 715-720 (2012)).

Astrocyte Differentiation Protocol

Astrocytes were differentiated as described in TCW, J et al., 2017 (TCW, J. et al. An Efficient Platform for Astrocyte Differentiation from Human Induced Pluripotent Stem Cells. Stem Cell Reports 9, 600-614 (2017)). NPC's were cultured with NEUROBASAL™ NPC Medium (DMEM/F12+GLU-TAMAX™ (L-glutamine substitute), NEUROBASAL™ Media (a basal medium), N-2 Supplement, B-27™ Supplement (a neuronal cell culture product), 5 mL GLUTA-MAX™, 10 mL NEAA, 10 mL penicillin-streptomycin) supplemented with bFGF (20 ng/mL). Astrocyte differentiation was induced using astrocyte medium (AM) (Sciencell, 1801). AM was changed every other day and cells passaged at a 1:3 split when 90% confluent.

Example 1: Building miBRAIN Model

Figure 1B:
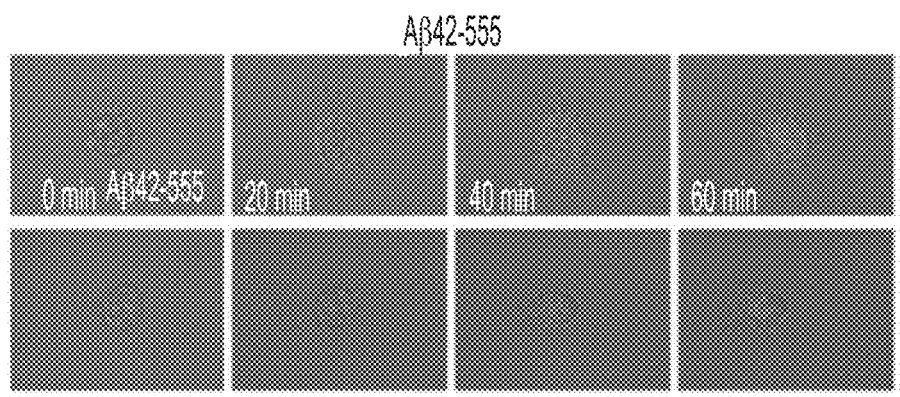
Figure 1C:
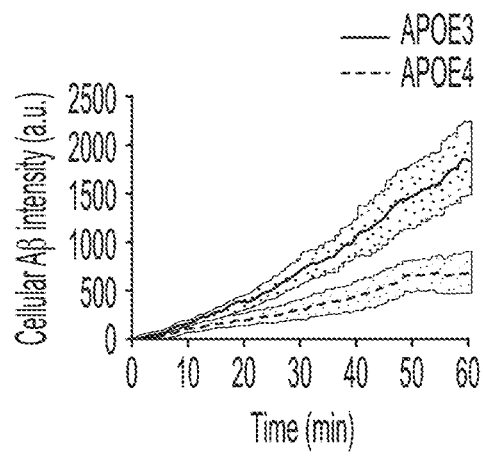

An iBBB, methods for rapidly generating neurons from iPSCs, 3D models of human myelination, and iPSC-derived microglia-like cells that integrate into cerebral organoids were utilized to 3D engineer tissues in order to produce a highly complex 3D miBRAIN model. To achieve this, three parameters were developed i) common media and growth conditions, ii) cell ratios and densities and iii) extracellular matrix scaffolding. For each parameter multiple conditions were screened in parallel to identify permissive conditions, as disclosed in more detail below. Multi-variable matrices can be used to systematically test combinations of the 3 parameters in parallel.

iPSC-derived microglia-like cells: Microglia are the resident immune cell of the human brain. Genetic studies are increasingly highlighting the importance of microglia in health and disease. In the AD brain, microglial are critical for clearance of amyloid and synaptic remodeling. Furthermore, recently microglia were found to be required for degeneration of myelin preceding cognitive impairments induced by chemotherapy. Protocol for differentiating iPSC into microglia-like cells has been optimized. Genetic polymorphisms associated with AD, such as APOE4, impair microglial function (FIG. 1). Given microglia importance to tissue homeostasis and disease pathogenesis, incorporating microglia into a miBRAIN-chip expanded the modeling capabilities of this model. During development, immature microglia migrated from the yolk-sac to populate the developing brain. In vitro, it is shown here that iPSC-derived immature microglia also migrated into 3D neuronal tissue where they occupied spatially distinct areas and performed complex functions such as the clearance of amyloid.

Incorporation of neuronal activity modulators and reporters: Amyloid-β exerts numerous detrimental effects on neurons. In vitro exposure of neurons to amyloid-β induces neuron dysfunction and can cause death within hours. In contrast, the human brain takes years of amyloid accumulation to have detectable consequence on cognitive function. However, prior to cognitive impairments Aβ impairs synaptic plasticity and circuit dysfunction. Studies in mice demonstrate that synaptic loss mediated by Aβ leads to neuronal hyper-excitability. Excitatory neuronal activity promotes the proteolytic processing of APP into Aβ and its subsequent release into the brain parenchyma. Thus, the amyloid deposition and neuronal hyper excitability create a feed-forward loop promoting the progression of AD. It has been demonstrated that increasing inhibitory neuronal activity by driving gamma oscillation can reduce amyloid plaques and promote activation of microglia in the mouse brain. Further genetic variation in humans may predispose certain individuals to hyper excitability and, therefore, accelerate pathological progression and cognitive degeneration.

Figure 2A:
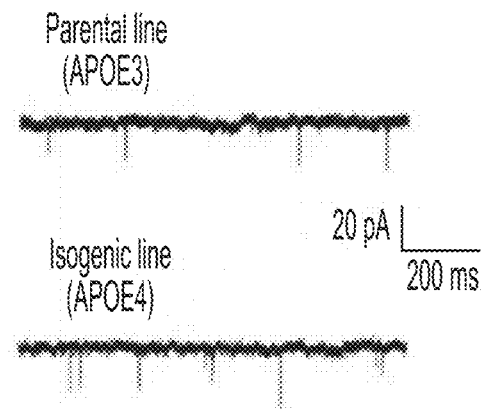
FIGS. 2A-2B show APOE4 neurons were hyperexcitable relative to APOE3 neurons.
Figure 2B:
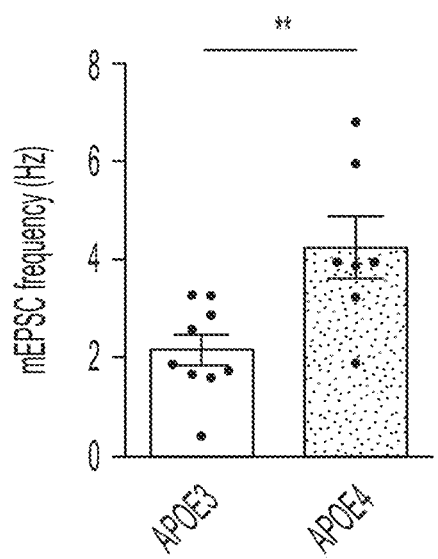

Using isogenic iPSC-derived neurons, it has been observed that APOE4 led to hyper-excitable neurons compared to APOE3 (FIG. 2). In FIG. 2A, mEPSC amplitude and frequency in iPSC-derived neurons for an isogenic APOE3 and APOE4 pair were assessed (FIG. 2B). In order to understand the pathological progression of AD and the efficacy of drugs targeting AD, assessments of neuronal activity were conducted. The miBRAIN-chip methods have non-invasively monitoring calcium dynamics, neuronal activity, and neurotransmitter release using genetically encoded reporters such as GCAMP6G, genetically encoded transmitter and voltage indicators (GETI) and (GEVI) incorporated. Furthermore, neuronal activity within the miBRAIN-chip may be monitored non-invasively using multi-electrode arrays (MEAs) without the requirement for a genetically encoded reporter.

In addition to promoting amyloid deposition, altered neuronal activity can have profound effects on non-neuronal cells. Cerebral vasculature and the BBB are intimately coupled to neuronal activity with increased activity promoting increased vascular permeability. Chronic hyper-excitability in the AD brain likely alters the BBB and could contribute to disease progression. Likewise, neuronal myelination and remodeling are influenced by neuronal activity. Hence, AD-related hyper-excitability may lead to dramatic changes in myelin organization in the human brain.

Figure 3A:
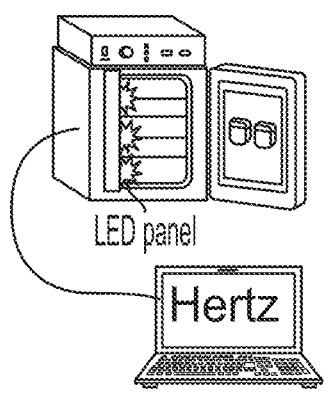
FIGS. 3A-3C show non-invasive modulation of neuronal activity via optogenetics.
Figure 3B:
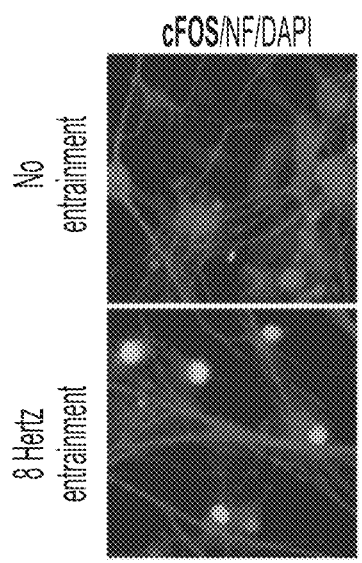
Figure 3C:
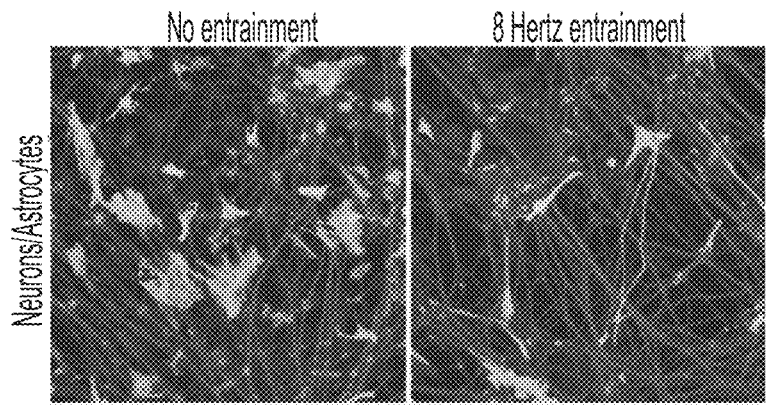

To assess how activity influence neuronal cells, neuronal activity was experimentally manipulated i) to examine the effect of neuronal activity on pathological progression, and ii) establish how altered neuronal activity influences non-neuronal cells such as the BBB, myelination, and microglial function. Towards this goal, tissue culture incubators with integrated blue LED lights that can be controlled via a computer were developed (FIG. 3A). This allows control over the activity of neurons that encode channelrhodopsin (ChR2). This setup allowed for the exposure of iPSC-derived neuronal cultures to pulses of activity or neuronal entrainment paradigms. It was confirmed that neuronal entrainment led to increased expression of activity markers in neurons such as cFOS. Furthermore, in 3D cultures of neurons and astrocytes, it was found that neurons exposed to an entrainment paradigm (8 Hrtz, 1 hour/day), astrocytes exhibited distinct changes in morphology and number.

Utilization of miBRAIN-Chip as a Model for AD, CAA, and Tauopathy.

Most Alzheimer's disease patients and 20-40% of non-demented elderly experience amyloid deposits along their cerebral vasculature, a condition known as CAA. CAA impairs BBB function promoting cerebral ischemia, hemorrhages, and accelerates cognitive decline. The E4 allele of APOE is the strongest known genetic risk factor for CAA and sporadic AD, however the mechanism underlying APOE4 pathogenesis is largely unknown. To model CAA, the iBBB was first formed and allowed to mature over 1 month. It was subsequently exposed to media conditioned by neural cells from individuals with fAD containing elevated levels of $A\beta$. iBBBs exposed to media conditioned by non-AD neural cells exhibited minimal $A\beta$ accumulation. In contrast, the same iBBBs exposed fAD neural media had significant amyloid accumulation suggesting the iBBB can model BBB amyloid deposition observed in vivo. To establish whether $A\beta$ accumulation is influenced by APOE genotype in the iBBB, iBBBs were generated from isogenic APOE3/3 and APOE4/4 iPSC. When exposed to conditioned media with elevated $A\beta$, APOE4/4 iBBBs consistently exhibited significantly more amyloid accumulation compared to isogenic APOE3/3 iBBBs.

Figure 4:
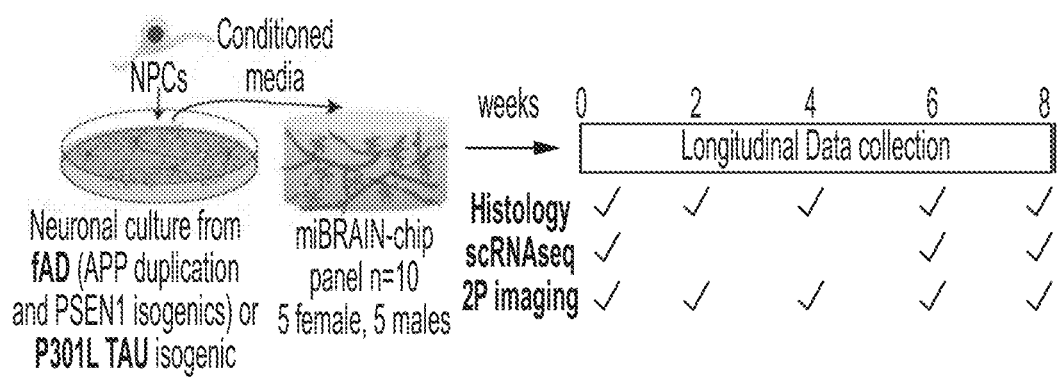
FIG. 4 shows modeling Alzheimer's disease (AD), cerebral amyloid angiopathy (CAA) and Tau pathology with miBrain-chip. A cohort of 12 miBrain-chips was exposed to conditioned media from fAD neuronal cells and monitored the pathological progression using histology, scRNAseq at multiple timepoints, non-invasive two-photon imaging.

Increased amyloid deposition in APOE4/4 was observed in multiple clones of an isogenic pair that was edited from APOE3/3 to E4/4. Likewise, editing iPSC from an individual with sporadic AD from E4/4 to E3/3 led to a significant reduction in amyloid accumulation demonstrating that increased amyloid deposition in APOE4/4 iBBBs is unlikely the result of clonal variation or genetic editing. APOE3/4 heterozygous humans also displayed an increased incidence of CAA and AD. Consistent with clinical observations, iBBBs generated from APOE3/4 individuals exhibited significantly more amyloid accumulation than iBBBs generated from APOE3/3 individuals. FIG. 4 depicts modeling AD, CAA and Tau pathology with the miBrain-chip. A cohort of 12 miBRAIN-chips were exposed to conditioned media from fAD neuronal cells and the pathological progression monitored using histology, scRNAseq at multiple timepoints, non-invasive two-photon imaging.

To establish the histological signatures of AD pathogenesis, a cohort of >12 iPSC lines consisting of 6 males and 6 females were used. 3D brain tissue was generated from each of these lines. Once they had matured into functional in vitro brain tissue, they were exposed to media conditioned by healthy control neuronal cells, familial AD neuronal cells and neuronal cells generated from iPSC lines with FTD mutations.

It was confirmed that conditioned media from control, fAD, and FTD neuronal cells respectively had low amyloid/low pTau (control), high amyloid/low pTau (fAD), and low amyloid/high pTau (FTD). This allowed us to expose miBRAIN-chips to each of the AD pertubens alone or together and measured the response. To asses histological changes in the in vitro brain tissue, the tissue was fixed and stained every two weeks over the course of 2 to 3 months. The development of amyloid plaques, and neurofibrillary tangles, as well as BBB integrity, myelin density, neuronal healthy, DNA damage, and numerous other histological markers associated with AD and cognitive decline were monitored (FIG. 4). From each timepoint, media was harvested and flash frozen from the miBRAIN cultures and could be analyzed at later timepoint's via proteomics or ELISA.

Figure 5:
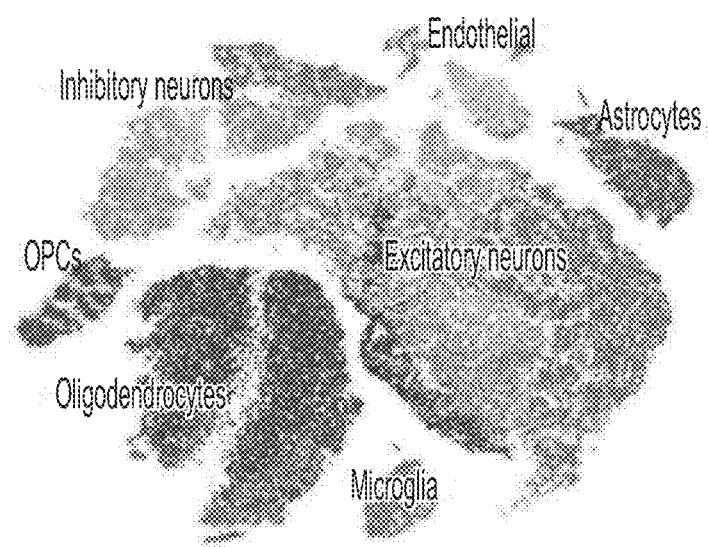
FIG. 5 shows single-cell RNAseq of human post-mortem brain provided a reference map for Alzheimer's disease (AD) and healthy brain states. t-SNE plot showed a two-dimensional representation of global gene expression profile relationships across 60,000 nuclei isolated from the hippocampus. Clusters were determined using a graph-based clustering approach as implemented by the R package Seurat. The cell type identity of each cluster was determined with marker genes.
Figure 6A:
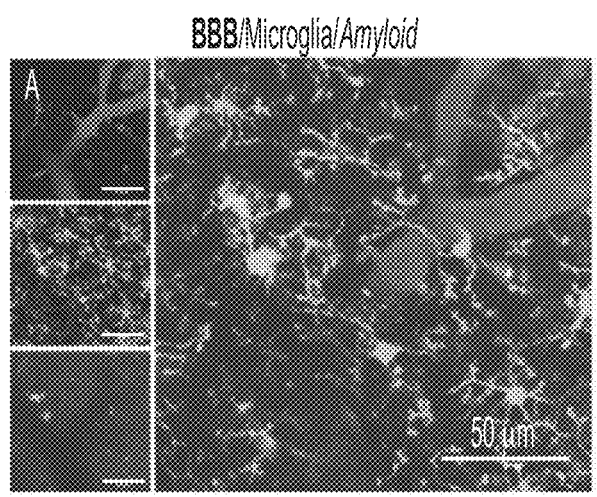
FIGS. 6A-6E show two-photon non-invasive imaging.
Figure 6B:
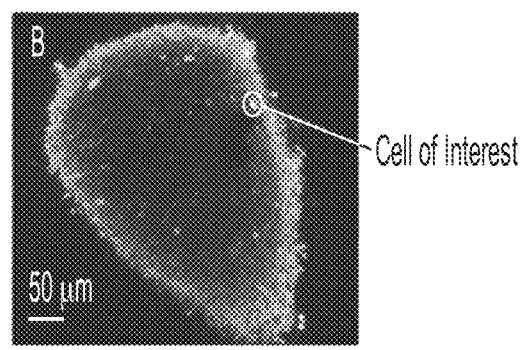
Figure 6C:
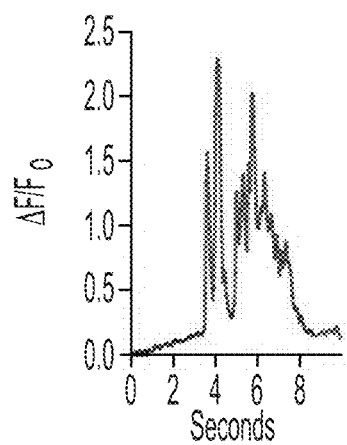
Figure 6D:
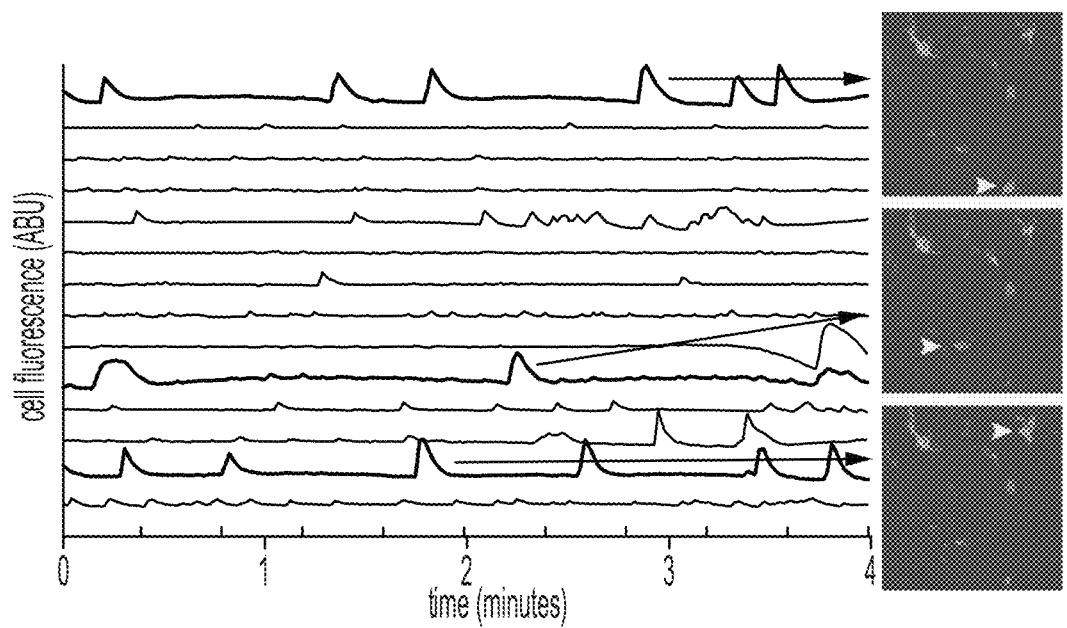
Figure 6E:
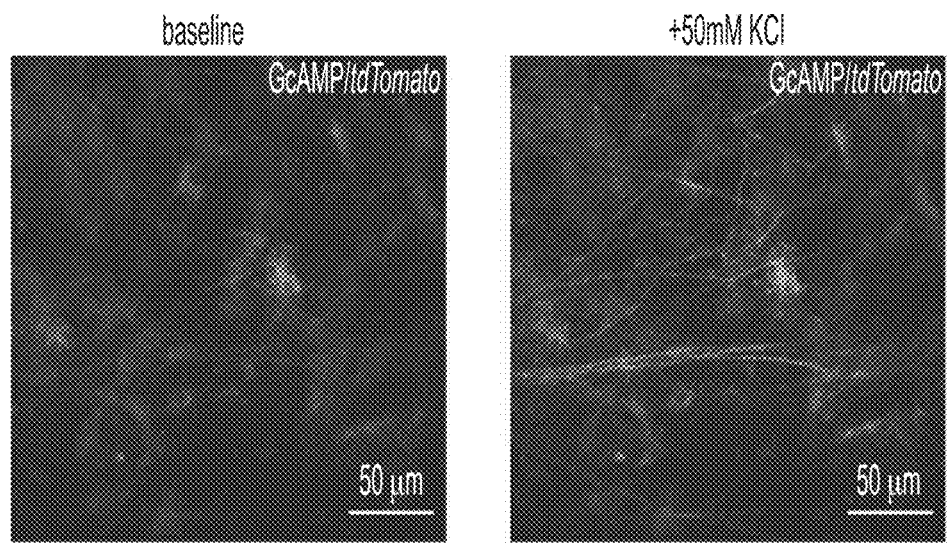
Figure 7:
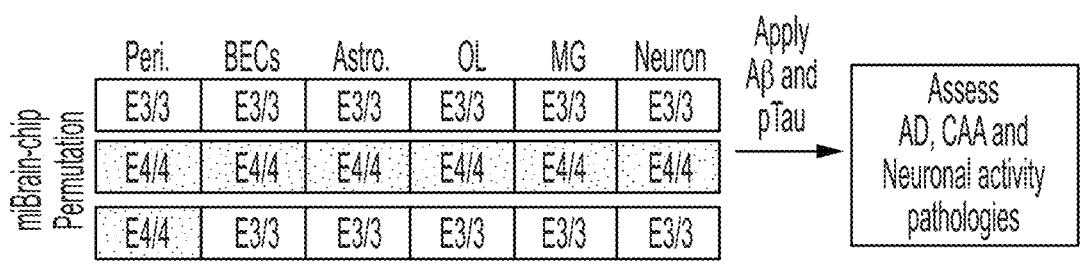
FIG. 7 shows combinatorial experiments to establish contribution of pericytes and other cell-types to APOE4 predisposition for AD and CAA pathologies. All APOE3/3 (E3/3) or all APOE4/4 (E4/4) miBrain chips containing Pericytes (Peri.), Brain endothelial cells (BECs), Astrocytes (Astro.), Oligodendrocytes (OL), Microglia (MG), and neurons produced from isogenic iPSCs.

Example 2: Correlation of Single Cell Transcriptional Dynamics of miBRAIN-Chip with Clinical End-Points Observed in Alzheimer's Disease Related Dementias (ADRD)

scRNAseq of 60,000 nuclei from 48 post-mortem human brains including 24 healthy controls and 24 patients with AD pathology and cognitive impairments was performed. The global gene expression of individual cells was clustered by t-SNE analysis. The cell-type identity of individual clusters was determined based on expression levels of cell-type specific marker genes (FIG. 5). Superimposing the disease status on each cluster revealed that cells from AD patients have unique disease associated signatures. OLs and OPCs from AD stood out as one of the most altered cell types in AD. Interestingly, the single cell transcriptional signatures from women were far more altered than men, suggesting there may be unique sex-linked neurodegenerative programs. While scRNAseq from post-mortem human brains highlighted end-state differences between cognitively normal and impaired individuals, it failed to inform how these differences arose. Establishing the transcriptional trajectory that led up to post-mortem end-states in the AD brain helped identify new therapeutic opportunities, pin-pointed more effective therapeutic windows and establish biomarkers for assessing therapeutic efficacy. scRNAseq of nuclei were performed on a subset (n=3) of miBRAIN-chips from the iPSC cohort that were identified to have low, moderate, high pathology from histological characterization. We examined 0, 6, and 8 weeks after exposure to amyloid-$\beta$ (FIG. 4).

Example 3: Profile AD Cellular Composition and Dynamics, Amyloid/pTau Deposition, and Neuronal Activity Via Non-Invasive Two-Photon Imaging To complement scRNAseq non-invasive 2-photon imaging of miBRAIN-chips was performed. In living mice, a three and four color live-image was established allowing tracking of amyloid build-up using methoxy-XO4 (blue), cellular movements and morphological changes using red and green fluorescent proteins and neuronal activity using GECIs and GEVIs (FIG. 6). For example, this has enabled the ability to follow and quantify track microglia and amyloid clearance in response to neuronal activity entrainments. 2-photon imaging was applied to non-invasively quantify how cellular interaction changes over the course of in vitro disease progression while simultaneously monitoring amyloid build-up. Calcium indicators (GCAMP6G), GEVI (ASAP3) and GETI were employed to monitor calcium oscillation, neuronal activity and neurotransmitter release.

In miBRAIN cultures, neurons expressing GCAMP6G calcium indicator developed calcium transients both spontaneously and in response to acute drug application (FIG. 6) which can be monitored using 2-photon imaging.

Figure 8:
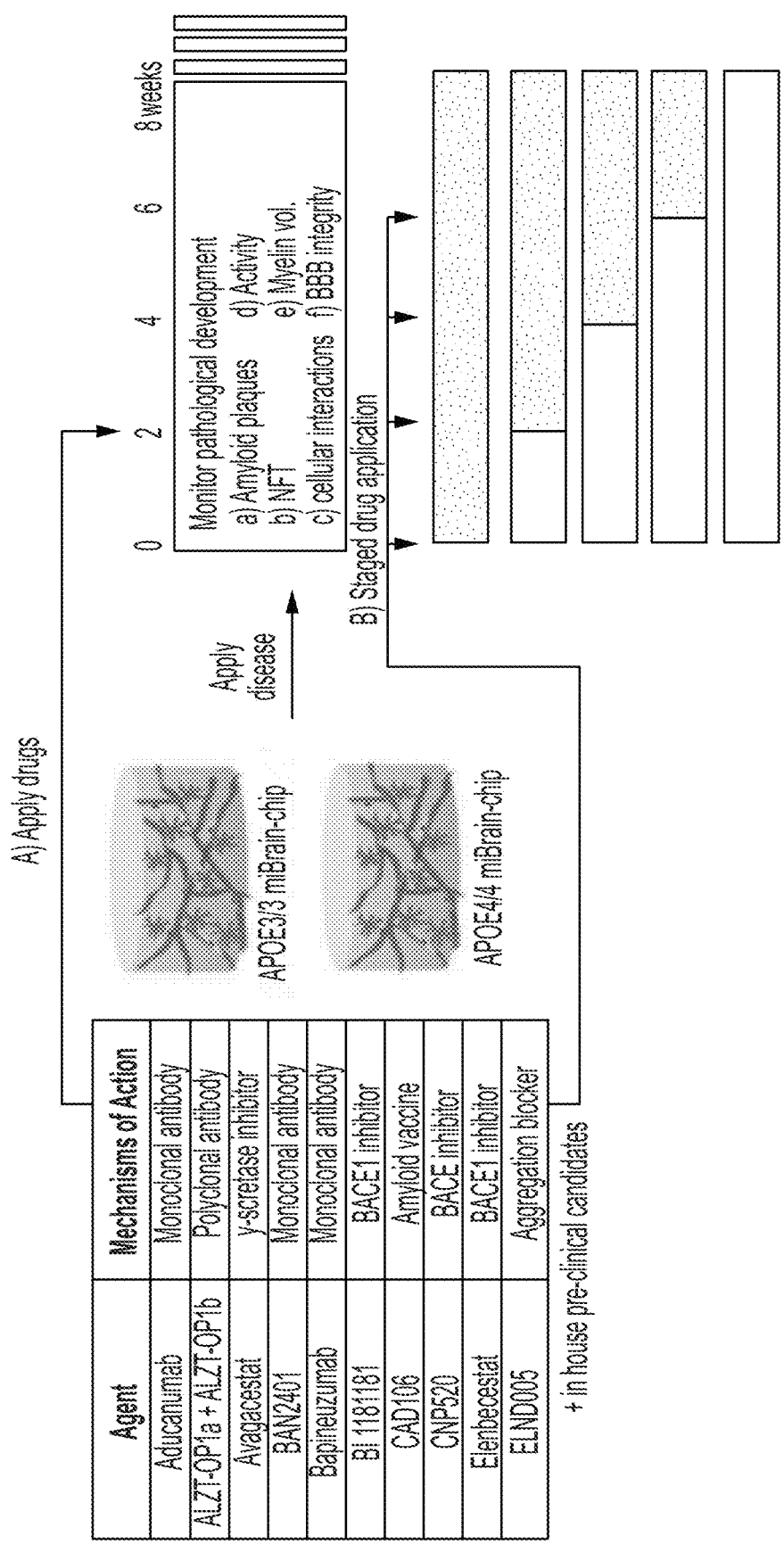
FIG. 8 shows a strategy overview for establishing miBrain-chips as an efficient model for screening and staging drug efficacy across genetically diverse populations. A panel of 10 AD therapeutics are screened for their ability to delay or reverse the pathological features or AD and CAA. Each of the therapeutics were applied at successive time points and assessed for their ability to reverse or delay pathological progression.

Example 4: Establish miBRAIN-Chip as a Rapid and Efficient Model for Drug Efficacy Testing There currently are no effective therapeutics to slow or reverse cognitive degeneration in AD. The failure to develop effective therapies for AD may stem from i) clinical trials incorporating genetic populations that are not responsive to a given therapy or ii) initiating treatment past a state where functional recovery is possible. Here, we will validate the miBRAIN-chip as a pre-clinical tool for segregating therapeutics based on genetically responsive populations and efficacy at each disease stage. To achieve this, we will use APOE3 and E4 isogenic miBRAIN-chips apply Aβ and/or pTau conditioned media to initiate disease development. After two weeks, we will simultaneously expose E3 and E4 miBrain-chips to AD therapeutics and subsequently monitor the pathological disease progression for each drug and genotype (FIG. 8). Ultimately, we will define the efficacy of each drug for each APOE-genotype. In a complementary line of experiments, we will also establish in vitro therapeutic windows for each drug that could inform clinical trial design. To do this we will apply AD perturbagens to APOE3 and E4 miBRAIN-chips and then apply drugs at different time-points throughout the in vitro disease progression (FIG. 8).

Example 5: Characterization of miBRAIN Cultures

Figure 9A:
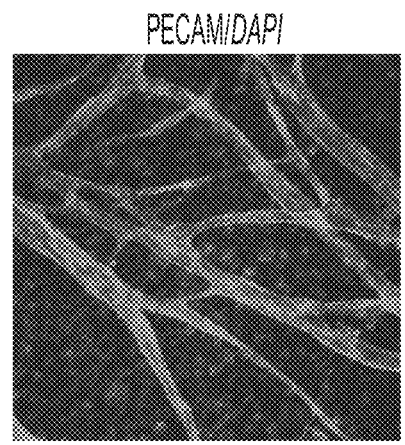
FIGS. 9A-9B show a picture of a stained miBRAIN which confirms integration of endothelial cells and pericytes in miBRAIN cultures.
Figure 9B:
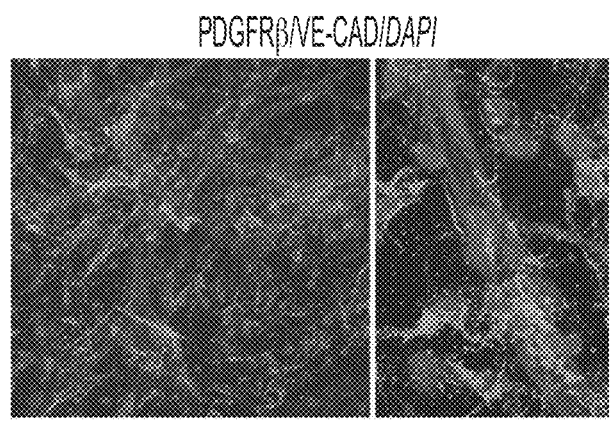

Development of Scaffolds:

miBRAIN cultures may employ the microvasculature as a scaffold to support the culture of additional cell-types. The differentiation of iPSC into endothelial cells that readily form vascular networks in a 3D microenvironment was explored. To achieve this, 4 different permutations of existing endothelial differentiation protocols were tested. Through these efforts, the iPSC endothelial differentiation protocols were refined to robustly yield pure populations of endothelial cells that readily form vascular networks in the 3D cultures. The miBRAIN-chips endothelial cells were further confirmed to be present and appropriately express endothelial cell markers PECAM, and VE-CAD (FIGS. 9A and 9B). It was found that pericytes expressing PDGFr are present in these miBRAIN cultures (FIG. 9B). There were a large number of pericytes present in miBRAIN cultures which were not localized on the vasculature. To optimize the pericyte density, the initial number of cells titrated into miBRAIN-chips as well as pericyte passage number were fine tuned.

Figure 10A:
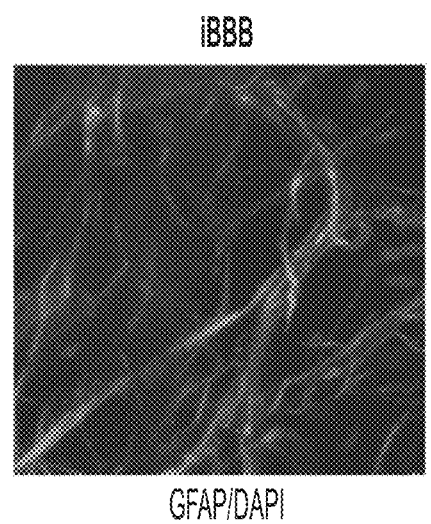
FIGS. 10A-10B show a picture of a stained iBBB (FIG. 10A) and miBRAIN (FIG. 10B) which demonstrates that Astrocytes in miBRAIN cultures exhibited complex radial morphologies in contrast to iBBB alone.
Figure 10B:
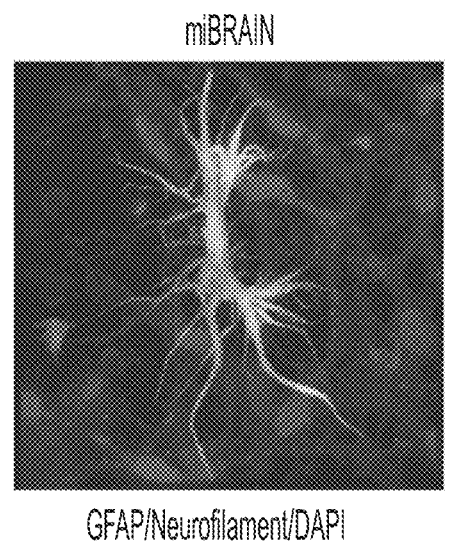

The presence and integration of astrocytes into miBRAIN cultures was confirmed through GFAP staining (FIG. 10). Astrocytes in iBBB cultures that contained endothelial cells, astrocytes and pericytes, astrocytes exhibited fibrous morphologies with limited radial processes (FIG. 10A). In contrast, astrocytes in miBRAIN culture exhibited radial morphologies with numerous processes extending from the cell body (FIG. 10B). This demonstrates that astrocyte's interactions with neurons and other cell-types influenced their morphologies as has been observed in intact mouse brain3 suggesting that miBRAIN cultures could be employed to investigate the astrocyte morphogenesis in human brain tissue.

Figure 11A:
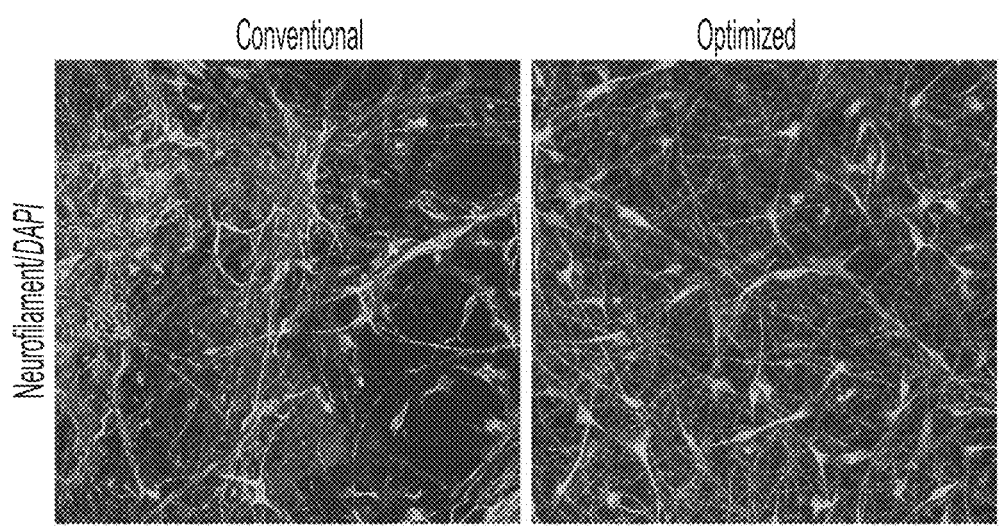
FIGS. 11A-11B show a picture demonstrating integration of neurons into miBRAIN cultures.
Figure 11B:
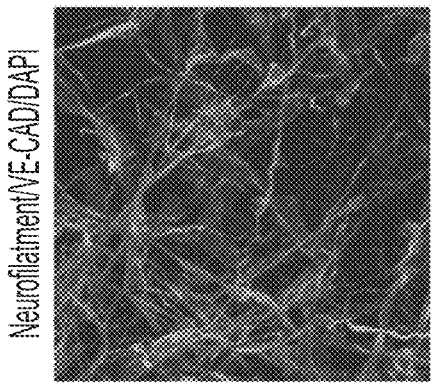

Incorporation of Neurons:

Neurons were successfully integrated into miBRAIN cultures and their presence confirmed with immunostaining for Neurofilaments. To incorporate neurons, neuronal differentiation protocols were modified to minimize the presence of proliferating precursor cells which continue to proliferate in miBRAIN cultures disrupting tissue integrity and homogeneity. Using an optimized neuronal differentiation protocol that incorporated cell synchronization, further lineages-specification, and drug-selection 3D cultures of pure human neurons were successfully generated (FIG. 11A) and these neurons were confirmed to robustly integrate into the miBRAIN cultures (FIG. 11B).

Figure 12:
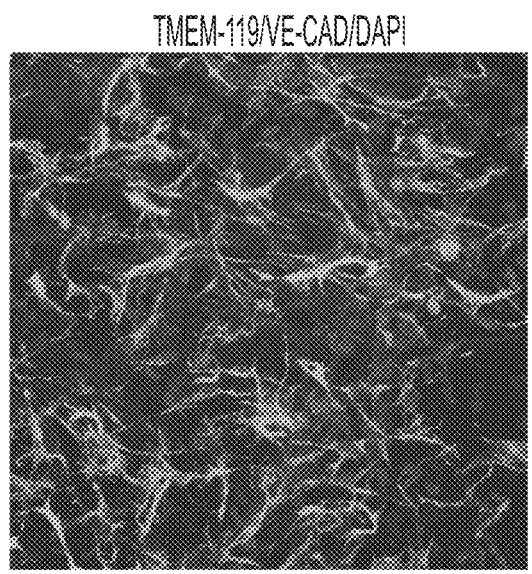
FIG. 12 shows a picture demonstrating microglia in miBRAIN cultures immunostain for microglial marker TMEM-119.

Microglia:

The presence of microglia in miBRAIN cultures was also confirmed through TMEM119 staining (FIG. 12). To integrate microglia into the miBRAIN, microglia was added directly to miBRAIN cultures. An alternative approach based on the Blurton-Jones laboratory observation that human hematopoietic progenitors cells (HPCs) injected into the mouse brain rapidly differentiate into microglia may also be used. Therefore, culturing HPCs in the miBRAIN would similarly lead to their differentiation into microglia.

Optimization of ECM

Figure 13:
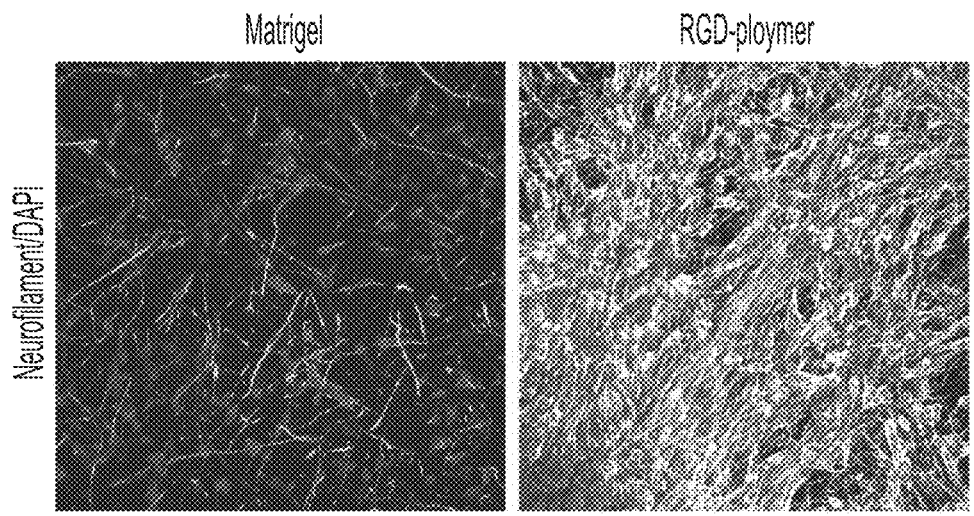
FIG. 13 shows a picture demonstrating optimization of ECM substrates. The same neurons were seeded into either MATRIGEL® (a solubilized basement membrane matrix) or RGD-polymer at the same concentration.
Figure 14A:
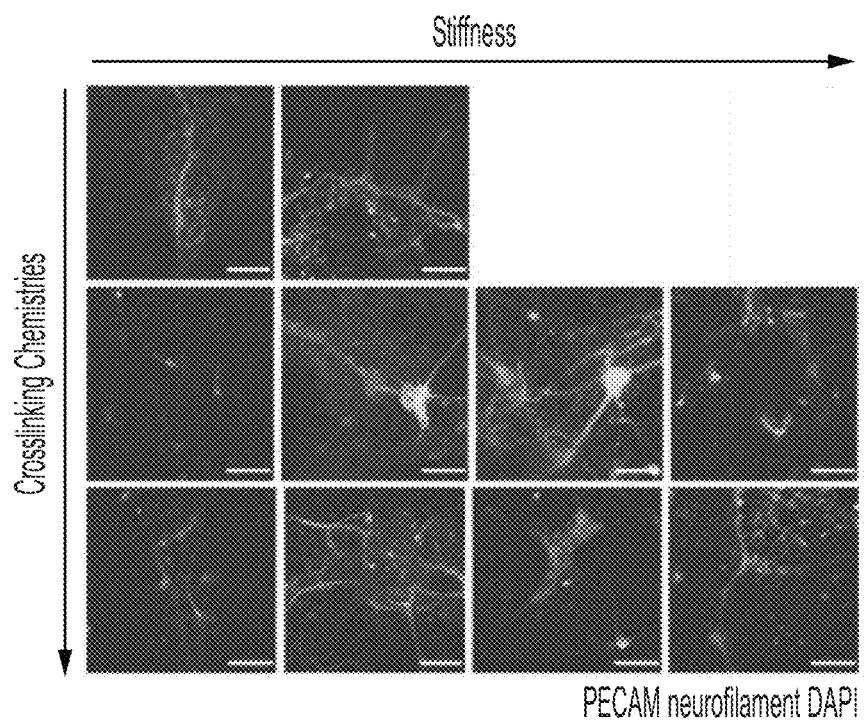
FIGS. 14A-14D show pictures demonstrating the optimization of engineered 3D hydrogel mechanical properties for miBRAIN cultures. Hydrogels were optimized for stiffness, crosslinking chemistry (FIG. 14A), and degradability (FIG. 14B) and neurons and endothelial cell phenotypes were assessed. Endothelial network properties (PECAM) and neuron maturity marker (neurofilament) were changed (FIGS. 14A and 14B). Hydrogel optimized for mechanical properties displayed enhanced neuronal morphology in long-term miBRAIN cultures compared to MATRIGEL® (a solubilized basement membrane matrix) (PECAM, Tuj, nuclear stain DAPI) (FIG. 14C).
Figure 14B:
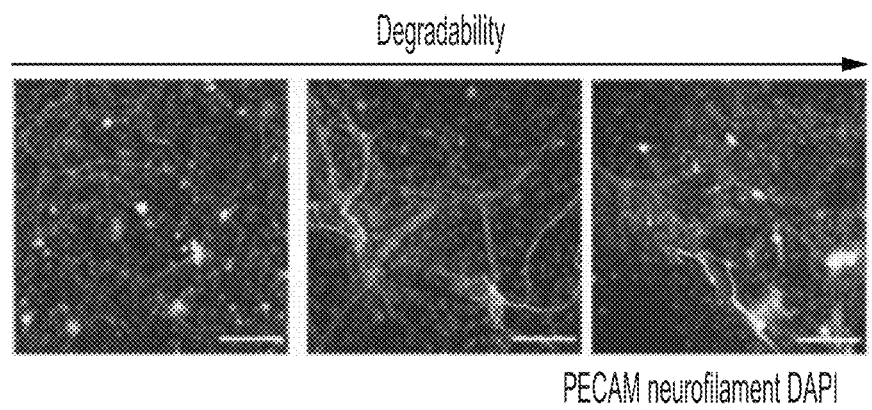
Figure 14C:
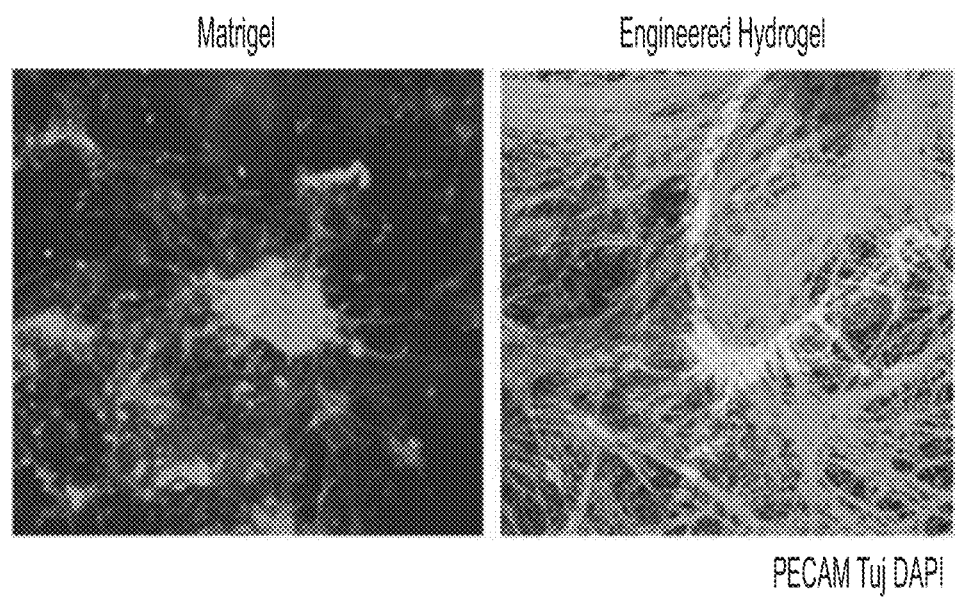
Figure 14D:
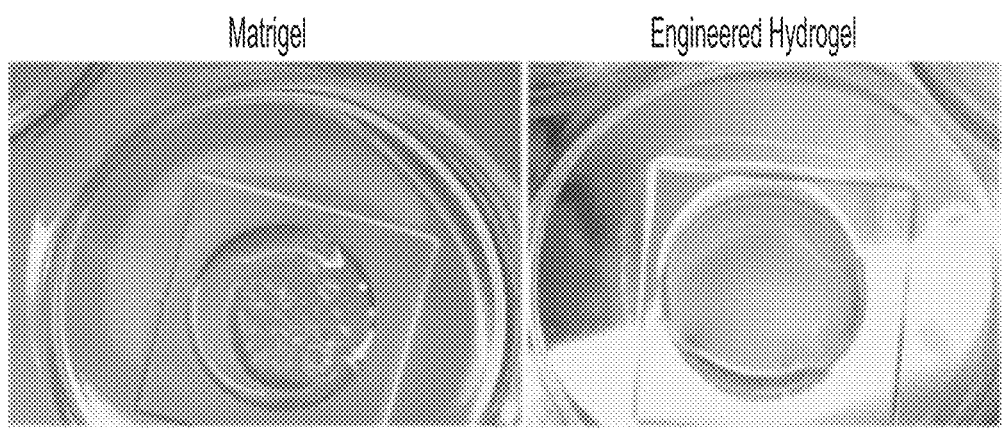

The ECM substrate used to support the 3D cultures was examined. Various ECM substrates MATRIGEL® (a solubilized basement membrane matrix), type-I collagen, hyaluronic acid-based hydrogels, dextran-based hydrogels, and polyethylene-glycol-based hydrogels were tested and with the inclusion of various biochemical factors, including RGD peptides, collagens, fibronectins, laminins, aggrecans, hyaluronic acids, heparan sulphates, thrombospondin, tenascin R, tenascin C, reelin, versicans, neurocans, brevicans, and other chondroitin sulphates, and peptides that mimic key signaling regions of these proteins and proteoglycans. It was found that the RGD-polymer supports neuronal cultures that appear denser than the same neurons at the same concentrations in MATRIGEL® (FIG. 13). Mechanical properties, polymer network properties, and hydrogel degradation were optimized for cell phenotypes and to ensure for long-term maintenance of cultures (FIG. 14). Importantly, engineered hydrogels maintained mechanical integrity overtime in culture compared to MATRIGEL® cultures.

Figure 15A:
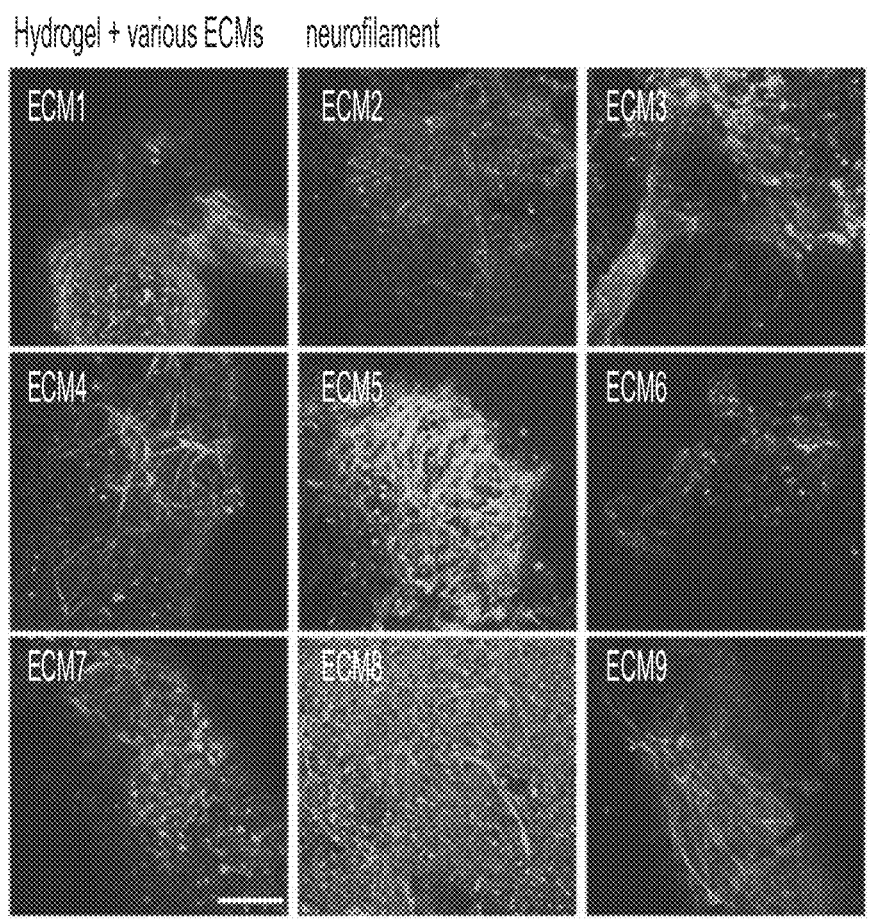
FIGS. 15A-15C show pictures and graphs of miBRAIN cultures in engineered hydrogels with various brain-mimetic ECM components. Neurons in miBRAIN cultures in various hydrogel formulations were characterized by neurofilament staining (neurofilament) (FIG. 15A) and their myelination by myelin basic protein (MBP) staining (MBP) (FIG. 15B). Graphs of electrical activity of miBRAINs show enhanced activity in engineered hydrogel miBRAIN cultures compared to neuron monoculture assessed via multielectrode array (FIG. 15C).
Figure 15B:
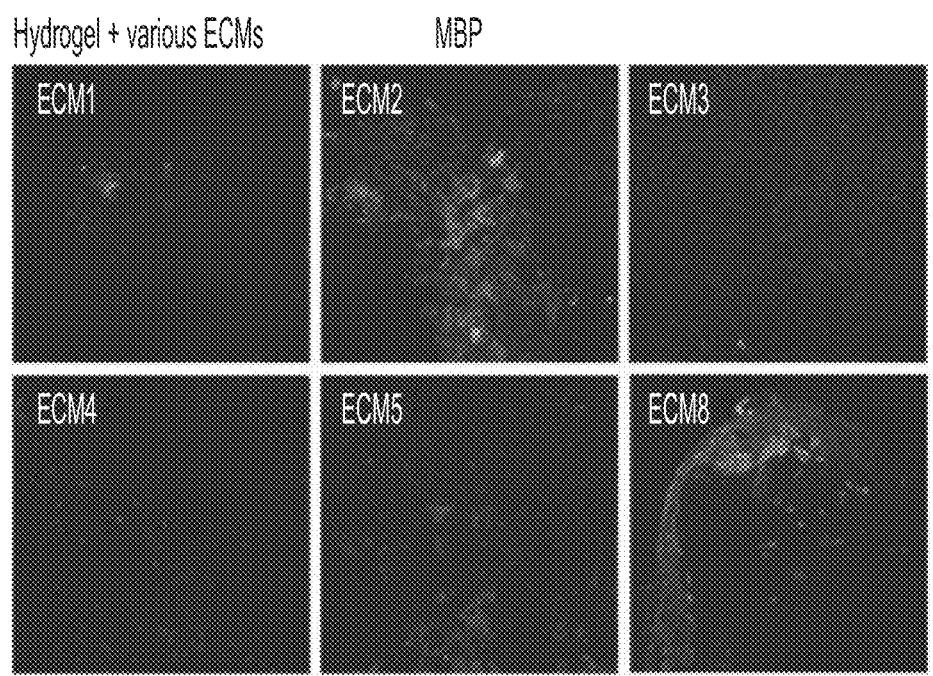
Figure 15C:
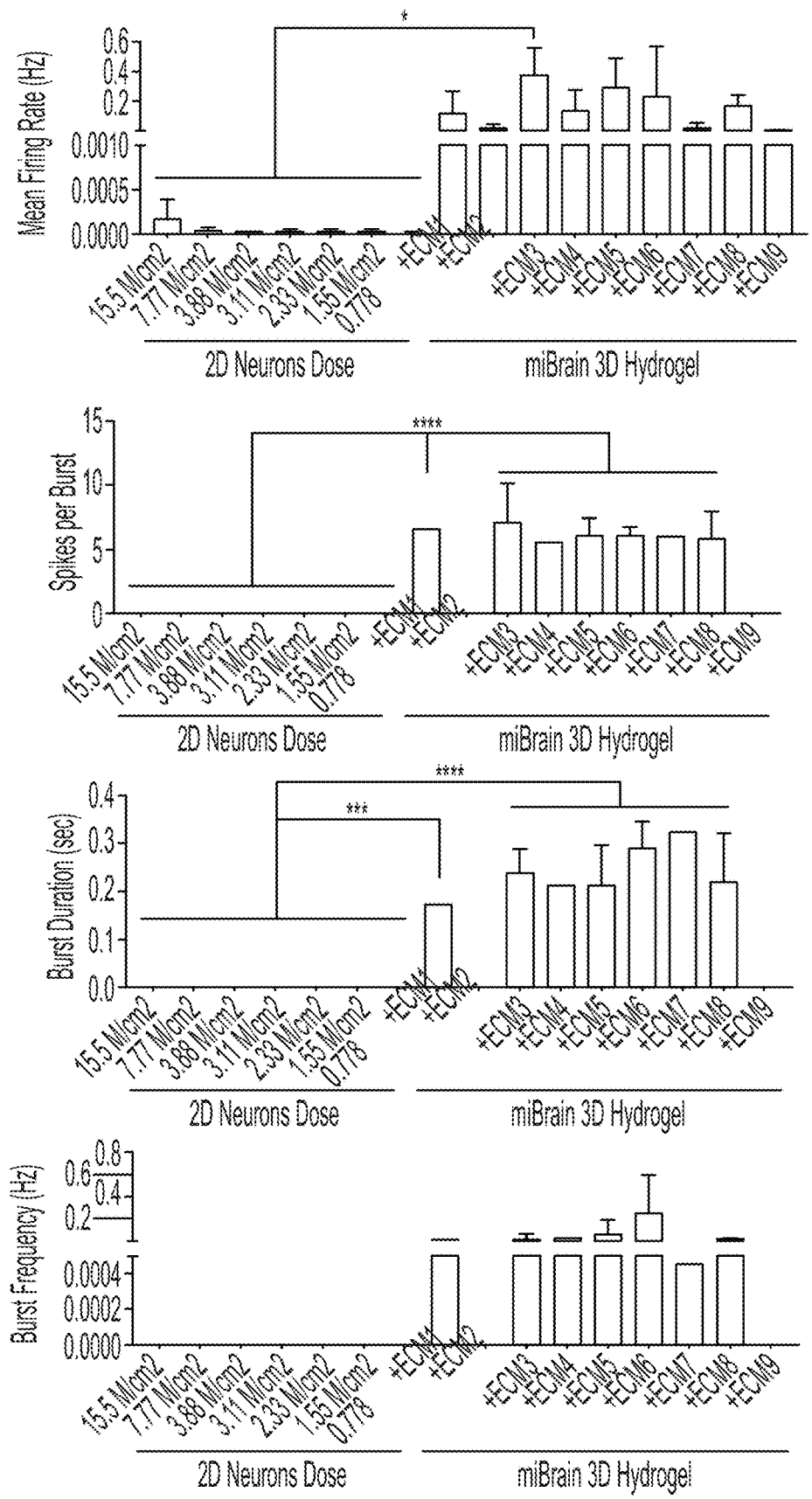
Figure 16A:
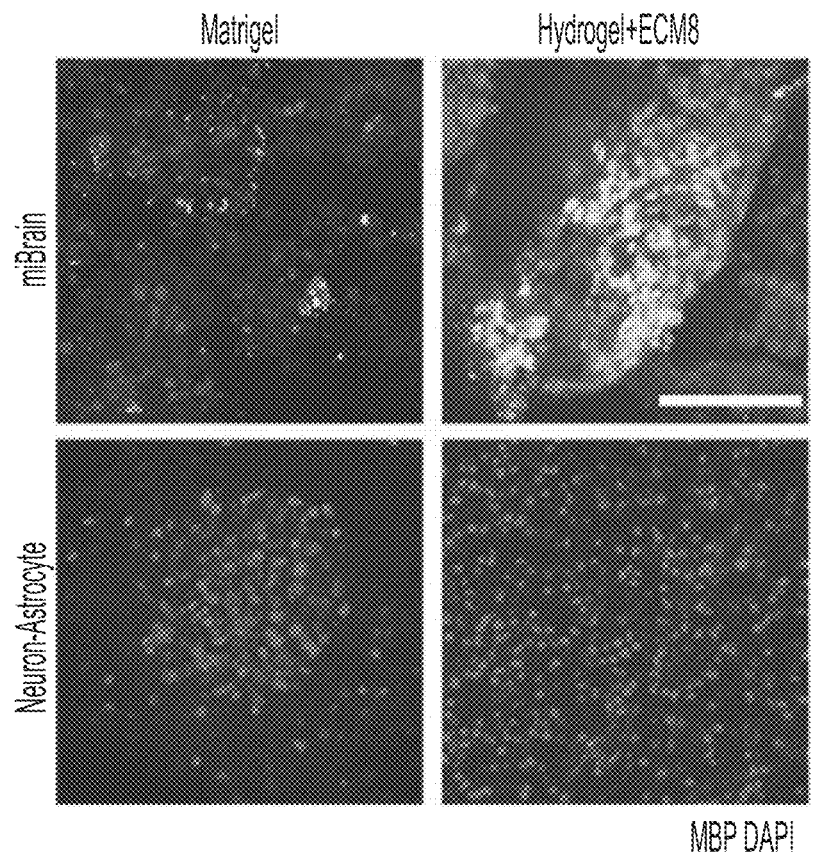
FIGS. 16A-16D show pictures and graphs of miBRAIN cultures in engineered hydrogel compared to a MATRIGEL® matrix (a solubilized basement membrane matrix). Assessment of MBP in engineered hydrogel matrix versus conventional MATRIGEL® for miBRAIN and neuron-astrocyte co-culture showed enhanced myelin basic protein staining (MBP) (FIG. 16A), elongated projections staining for neurofilament (neurofilament) (FIG. 16B), and this ECM led to co-localization of MBP+ oligodendrocytes along neurofilament+ neurons (FIG. 16C). Graphs of electrical activity in engineered hydrogel matrix versus MATRIGEL® for miBRAINs show enhanced activity in engineered hydrogel miBRAIN cultures (FIG. 16D).
Figure 16B:
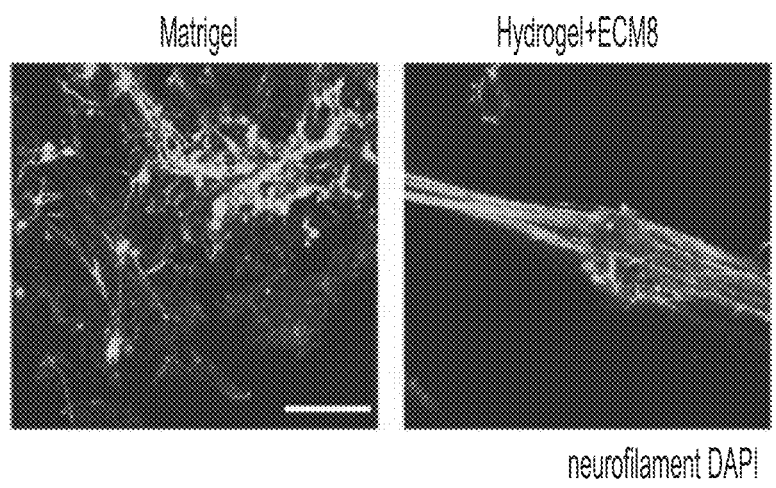
Figure 16C:
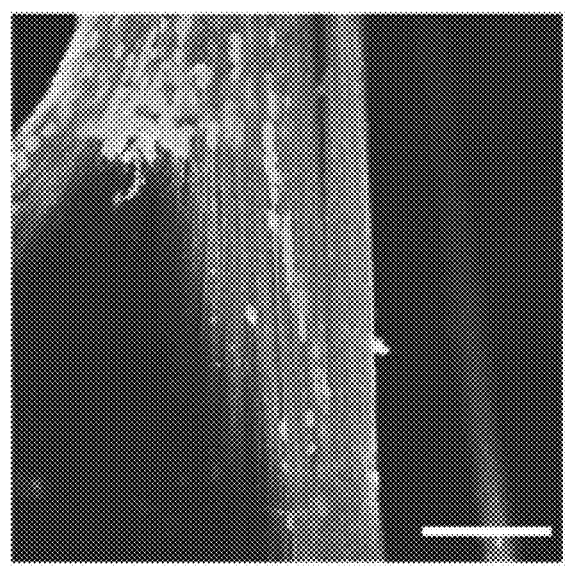
Figure 16D:
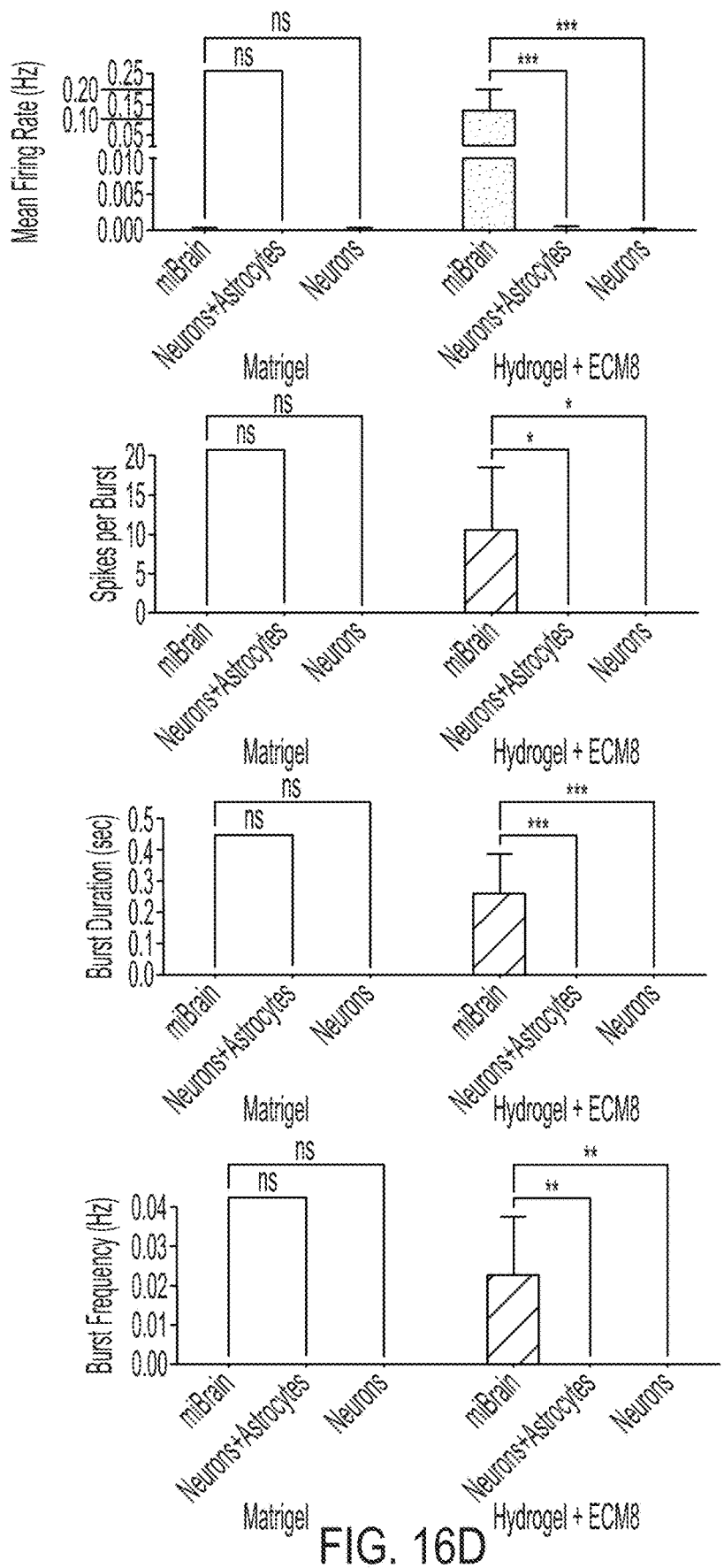

Brain-mimicking ECMs were included to further enhance neuronal maturation in miBRAIN cultures. Various ECMs were incorporated into engineered hydrogel formulations and modulated neurofilament and myelin basic protein staining. Engineered hydrogel miBRAIN cultures with these various ECMs displayed enhanced electrical activity compared to neuronal monoculture (FIG. 15). These optimized hydrogels enhanced neuronal maturation, myelination, and electrical activity of miBRAIN cultures compared to MATRIGEL® (FIG. 16).

Additionally, immunostaining of engineered hydrogel cultures and RGD polymers displayed less background fluorescence, requiring significantly less washing than MATRIGEL®, which could dramatically reduce the time required for staining and increase assay throughput.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features. From the above description, one skilled in the art can easily ascertain the essential characteristics of the present disclosure, and without departing from the spirit and scope thereof, can make various changes and modifications of the present disclosure to adapt it to various usages and conditions. Thus, other embodiments are also within the claims.

EQUIVALENTS AND SCOPE

Those skilled in the art will recognize, or be able to ascertain using no more than routine experimentation, many equivalents to the specific embodiments of the present disclosure described herein. The scope of the present disclosure is not intended to be limited to the above description, but rather is as set forth in the appended claims. In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The present disclosure includes embodiments in which exactly one member of the group is present in, employed in, or otherwise relevant to a given product or process. The present disclosure includes embodiments in which more than one, or all of the group members are present in, employed in, or otherwise relevant to a given product or process.

Furthermore, the present disclosure encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the present disclosure, or aspects of the present disclosure, is/are referred to as comprising particular elements and/or features, certain embodiments of the present disclosure or aspects of the present disclosure consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the present disclosure, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present disclosure that falls within the prior art may be explicitly excluded from any one or more of the claims. Because such embodiments are deemed to be known to one of ordinary skill in the art, they may be excluded even if the exclusion is not set forth explicitly herein. Any particular embodiment of the present disclosure can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present disclosure, as defined in the following claims.

What is claimed is:

1. A multi-cellular integrated micro brain (miBRAIN) comprising a 3-dimensional (3D) matrix comprising an interconnected cerebrovascular network comprised of human brain endothelial cell (BEC) vessels positioned in the 3D matrix and comprised of human pluripotent stem cell-derived endothelial cells, human pluripotent stem cell-derived pericytes proximal to the BEC vessel and physically interacting with an apical surface of the BEC vessels, human pluripotent stem cell-derived astrocytes, human myelinated cells, each of which is co-cultured in and dispersed throughout the 3D matrix, and optionally immune cells, wherein the 3D matrix comprises a material selected from the group consisting of an engineered hydrogel, exogenous RGD polymers and dextran.

2. A multi-cellular integrated micro brain (miBRAIN) comprising a 3-dimensional (3D) matrix comprising an interconnected cerebrovascular network comprised of human pluripotent stem cell-derived endothelial cells, human pluripotent stem cell-derived pericytes, human pluripotent stem cell-derived astrocytes, human pluripotent stem cell-derived neuron cells, human pluripotent stem cell-derived microglial cells, and human oligodendrocytes or oligodendrocyte precursor cells (OPCs), each of which is co-cultured in, housed within, and dispersed throughout the 3D matrix, and forms the interconnected cerebrovascular network, wherein the 3D matrix comprises a material selected from the group consisting of an engineered hydrogel, exogenous RGD polymers and dextran.

3. The miBRAIN of claim 1, wherein the 3D matrix comprises an extracellular matrix (ECM) substrate.

4. The miBRAIN of claim 1, wherein the 3D matrix comprises type-I collagen.

5. The miBRAIN of claim 1, wherein the 3D matrix comprises a solubilized basement membrane preparation.

6. The miBRAIN of claim 1, wherein the 3D matrix comprises arginine, glycine, aspartic acid (RGD)-polymer.

7. The miBRAIN of claim 1, wherein the microglial cells are derived from human hematopoietic progenitor cells (HPCs).

8. The miBRAIN of claim 1, wherein the astrocytes in miBRAIN exhibit radial morphologies with numerous processes extending from the cell body.

9. The miBRAIN of claim 1, wherein the endothelial cells express endothelial cell markers platelet endothelial cell adhesion molecule (PECAM) and/or vascular endothelial-cadherin (VE-CAD).

10. The miBRAIN of claim 1, wherein the pericytes express neuron-glial antigen 2 (NG2) and/or platelet derived growth factor receptor beta (PDGFrB).

11. The miBRAIN of claim 1, further comprising a culture media comprising human endothelial serum-free medium (hESFM), astrocyte growth supplement (AGS), and B27.

12. The miBRAIN of claim 11, wherein the culture media comprises human endothelial serum-free medium (hESFM), astrocyte growth supplement (AGS), antioxidants, catalase, superoxide dismutase and one or more supplements selected from the group consisting of neurotrophin-3 (NT3), triiodothyronine (T3), insulin-like growth factor (IGF), platelet derived growth factor subunit B (PDGFB), cyclic adenosine monophosphate (cAMP), amino acids (AA), brain-derived neurotrophic factor (BDNF), Glial cell derived neurotrophic factor (GDNF), macrophage colonystimulating factor (mCSF), interleukin 34 (IL34), and vascular endothelial growth factor A (VegF-A).

13. The miBRAIN of claim 1, further comprising at least one biochemical factor selected from the group consisting of: RGD peptide, collagen, fibronectin, laminin, aggrecan, hyaluronic acid, heparin, reelin, tenascin-R (TenR), tenascin-C (TenC), brevican (BCN), versican (VCN), neurocan (NCN), and thrombospondin-1 (TSP1).

14. The miBRAIN of claim 13, wherein the at least one biochemical factor comprises an RGD peptide.

15. The miBRAIN of claim 1, wherein at least one cell is an iPSC-derived cell.

16. The miBRAIN of claim 1, wherein at least one cell is an APOE4 neuron.

17. The miBRAIN of claim 1, wherein the astrocytes express GFAP and S100b.

18. The miBRAIN of claim 1, wherein the 3D matrix is comprised of dextran.

19. The miBRAIN of claim 1, further comprising human pluripotent stem cell-derived neurons.

20. The miBRAIN of claim 1, further comprising human pluripotent stem cell-derived microglial cells.

\* \* \* \* \*

UNITED STATES PATENT AND TRADEMARK OFFICE
CERTIFICATE OF CORRECTION

PATENT NO. : 12,441,987 B2
APPLICATION NO. : 17/458838
DATED : October 14, 2025
INVENTOR(S) : Li-Huei Tsai et al.

Page 1 of 1

It is certified that error appears in the above-identified patent and that said Letters Patent is hereby corrected as shown below:

In the Specification

Column 1, Lines 16-19, GOVERNMENT SUPPORT section should read:
This invention was made with government support under NS115064 awarded by the National Institutes of Health. The government has certain rights in the invention.

Signed and Sealed this
Twenty-fifth Day of November, 2025

John A. Squires
*Director of the United States Patent and Trademark Office*